United States Patent
Shoeb et al.

(10) Patent No.: US 11,940,158 B2
(45) Date of Patent: Mar. 26, 2024

(54) DUAL-BURNER ASSEMBLIES FOR COOKBOXES OF GAS GRILLS

(71) Applicant: Weber-Stephen Products LLC, Palatine, IL (US)

(72) Inventors: Mohammed Shoeb, Hoffman Estates, IL (US); J. Michael Anthony Alden, Nokomis, FL (US)

(73) Assignee: Weber-Stephen Products LLC, Palatine, IL (US)

( * ) Notice: Subject to any disclaimer, the term of this patent is extended or adjusted under 35 U.S.C. 154(b) by 129 days.

(21) Appl. No.: 17/648,532

(22) Filed: Jan. 20, 2022

(65) Prior Publication Data

US 2022/0333785 A1    Oct. 20, 2022

Related U.S. Application Data

(60) Provisional application No. 63/175,998, filed on Apr. 16, 2021.

(51) Int. Cl.
| | | |
|---|---|---|
| F24C 3/08 | (2006.01) | |
| A47J 37/07 | (2006.01) | |
| F23D 23/00 | (2006.01) | |
| F24C 3/12 | (2006.01) | |
| F24C 15/14 | (2006.01) | |

(52) U.S. Cl.
CPC ............ F24C 3/085 (2013.01); A47J 37/0713 (2013.01); A47J 37/0786 (2013.01); F23D 23/00 (2013.01); F24C 3/126 (2013.01); F24C 15/14 (2013.01)

(58) Field of Classification Search
CPC .......... F24C 3/126; F24C 3/085; F24C 15/14; F23D 23/00; A47J 37/0786; A47J 37/0713

USPC .......................... 126/41 R, 25 R; 431/42–47
See application file for complete search history.

(56) References Cited

U.S. PATENT DOCUMENTS

| | | | |
|---|---|---|---|
| 2,106,310 A | | 1/1938 | Warrick |
| 2,398,215 A | * | 4/1946 | Eskin ........................ F23Q 9/12 |
| | | | 431/46 |
| 5,617,778 A | | 4/1997 | Schroeter et al. |
| 5,638,808 A | | 6/1997 | Home |
| 5,811,359 A | * | 9/1998 | Romanowski ....... A41D 31/085 |
| | | | 428/36.1 |

(Continued)

FOREIGN PATENT DOCUMENTS

| | | |
|---|---|---|
| DE | 102006009580 | 9/2007 |
| EP | 3552528 | 10/2019 |
| EP | 2769654 | 9/2020 |

OTHER PUBLICATIONS

International Searching Authority, "International Search Report and Written Opinion," issued in connection with International Patent Application No. PCT/US2022/019324, dated Jun. 20, 2022, 9 pages.

(Continued)

*Primary Examiner* — Vivek K Shirsat

(57) ABSTRACT

Example dual-burner assemblies for cookboxes of gas grills are disclosed. An example dual-burner assembly includes a first burner tube and a second burner tube. The first burner tube has a first maximum heat output. The second burner tube has a second maximum heat output. The second burner tube is spaced apart from the first burner tube by a distance of no more than 0.750 inches. The second maximum heat output is less than the first maximum heat output.

23 Claims, 24 Drawing Sheets

(56) References Cited

U.S. PATENT DOCUMENTS

| | | |
|---|---|---|
| 7,096,887 B2 | 8/2006 | Tupa et al. |
| 8,033,279 B2 | 10/2011 | Shaffer |
| 8,297,317 B2 | 10/2012 | Jones |
| 8,464,766 B2 | 6/2013 | Ito et al. |
| 8,858,225 B2 | 10/2014 | Hiraga |
| 8,991,386 B2 | 3/2015 | Ahmed |
| 9,057,520 B2 | 6/2015 | Jones |
| 9,066,620 B2 | 6/2015 | French et al. |
| 9,303,868 B2 | 4/2016 | Smit |
| 9,970,656 B2 | 5/2018 | French et al. |
| 10,159,380 B2 | 12/2018 | Rummel et al. |
| 10,646,072 B2 | 5/2020 | Ahmed |
| 10,820,750 B2 | 11/2020 | Chin et al. |
| 10,835,078 B2 | 11/2020 | Querejeta Andueza et al. |
| 10,837,668 B2 | 11/2020 | Ye |
| 2005/0138789 A1* | 6/2005 | Offredi ................ F23D 14/105 126/26 |
| 2010/0095951 A1 | 4/2010 | Ahmed |
| 2010/0252020 A1 | 10/2010 | Siow |
| 2014/0251302 A1 | 9/2014 | Ahmed |
| 2019/0093885 A1 | 3/2019 | Kalisiak |
| 2019/0274478 A1 | 9/2019 | Querejeta Andueza et al. |
| 2019/0313849 A1 | 10/2019 | Yin et al. |

OTHER PUBLICATIONS

International Searching Authority, "International Preliminary Report on Patentability," issued in connection with International Patent Application No. PCT/US2022/019324, dated Oct. 12, 2023, 5 Pages.

\* cited by examiner

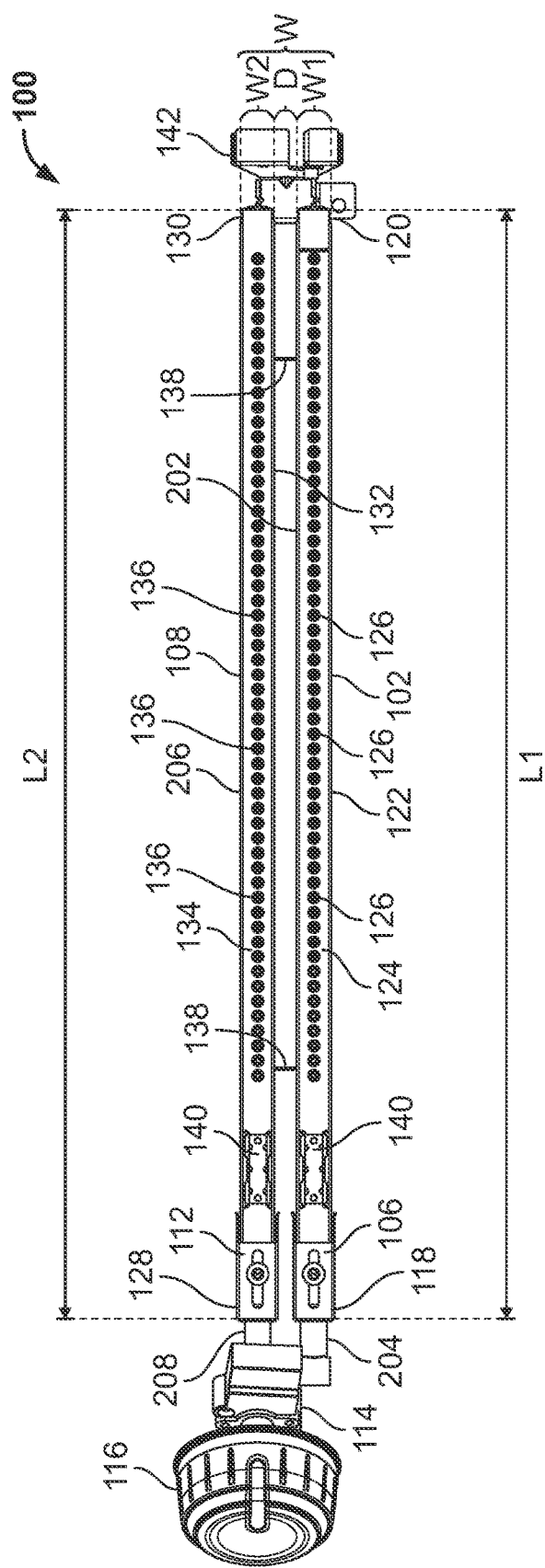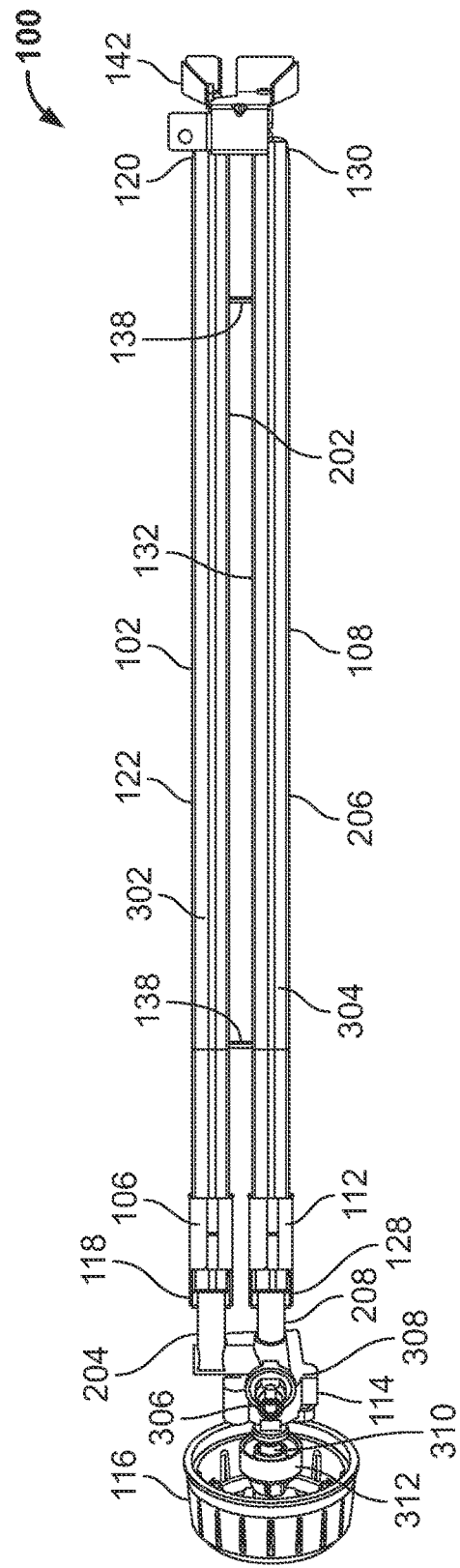

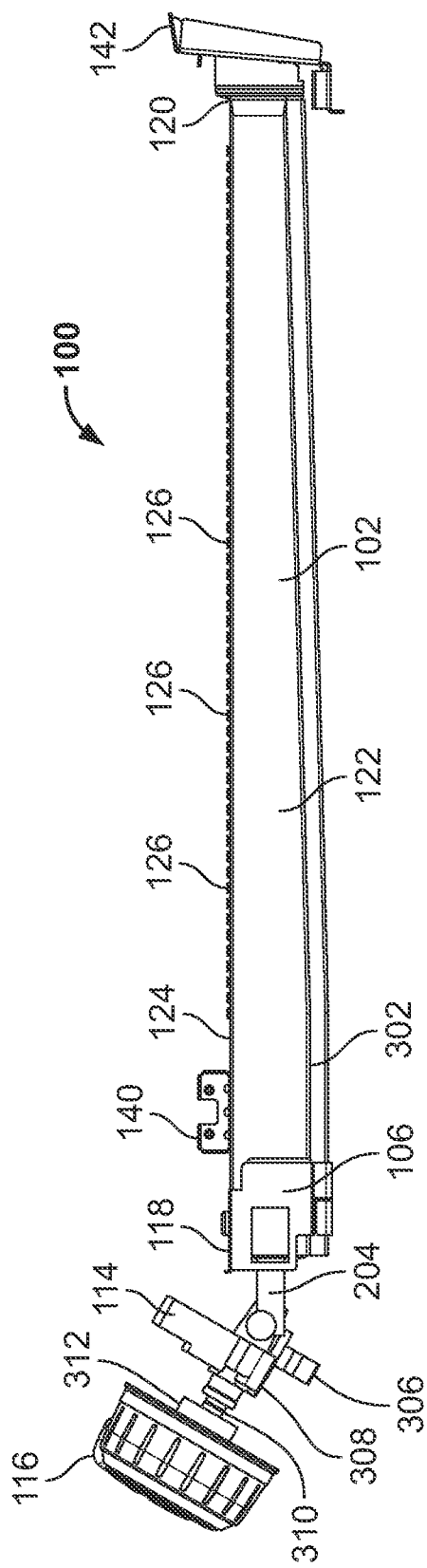
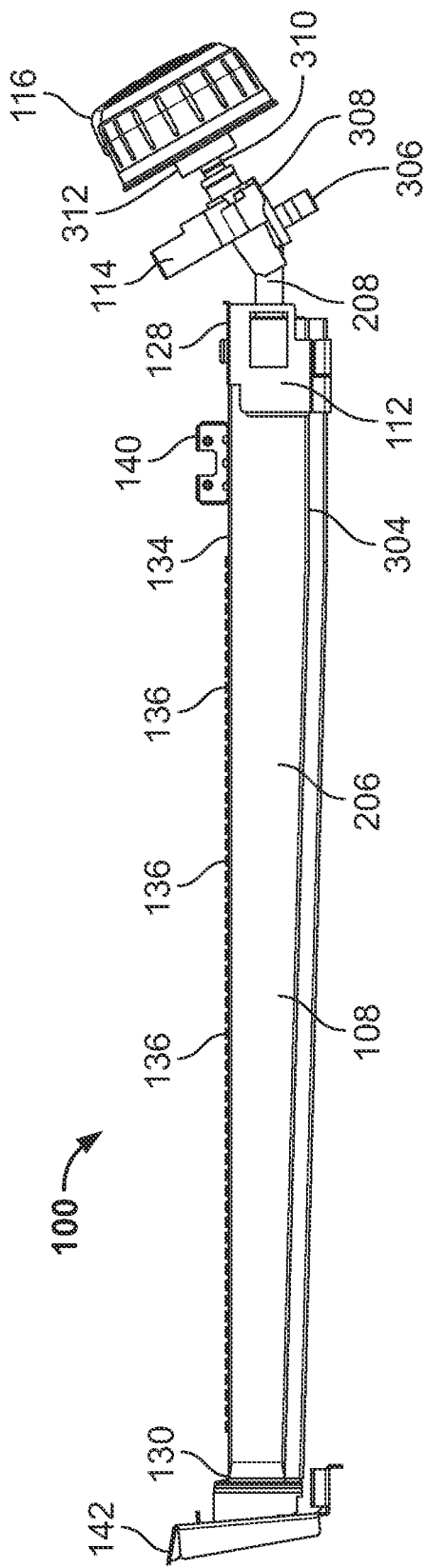
FIG. 4
FIG. 5

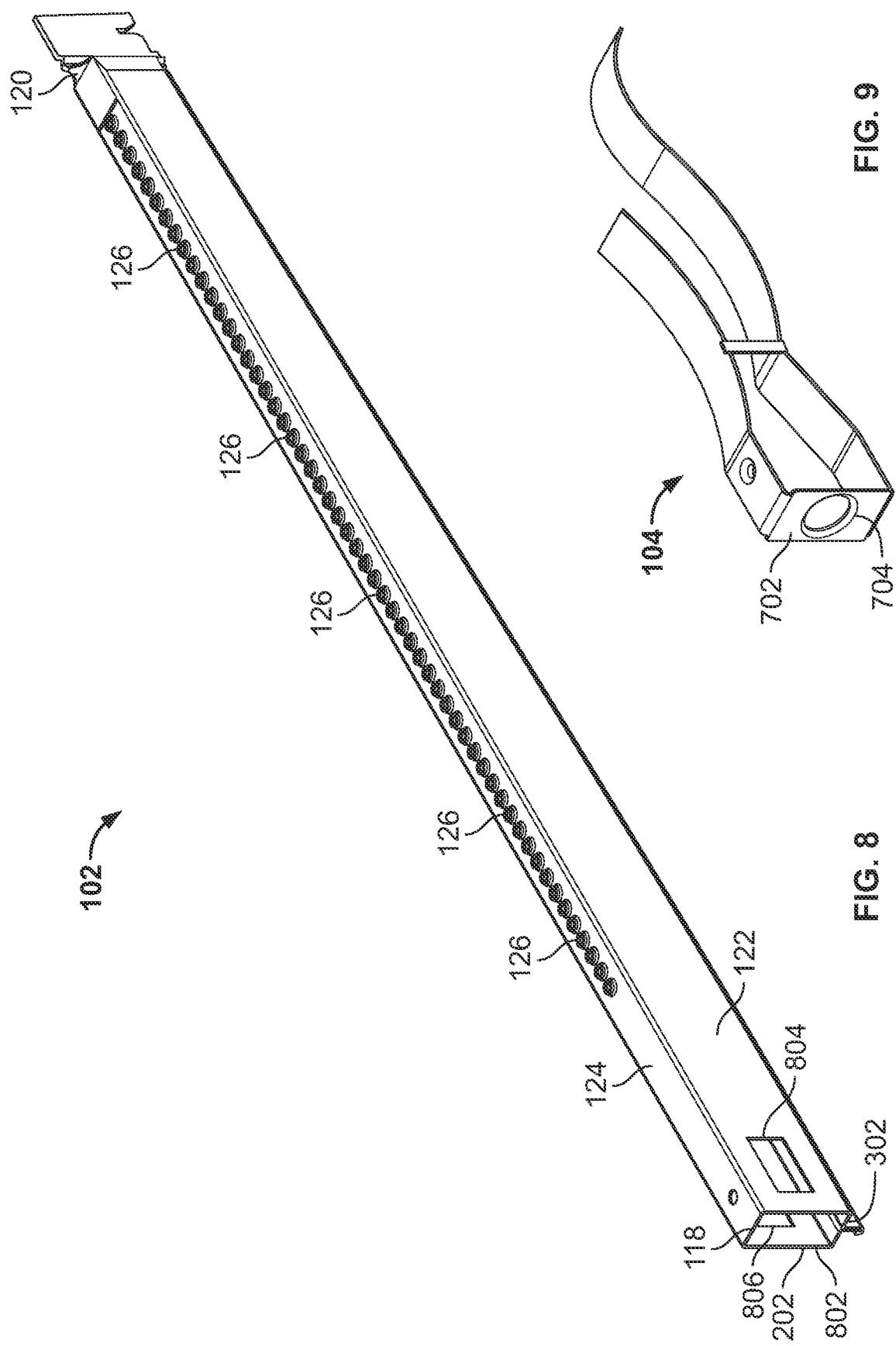

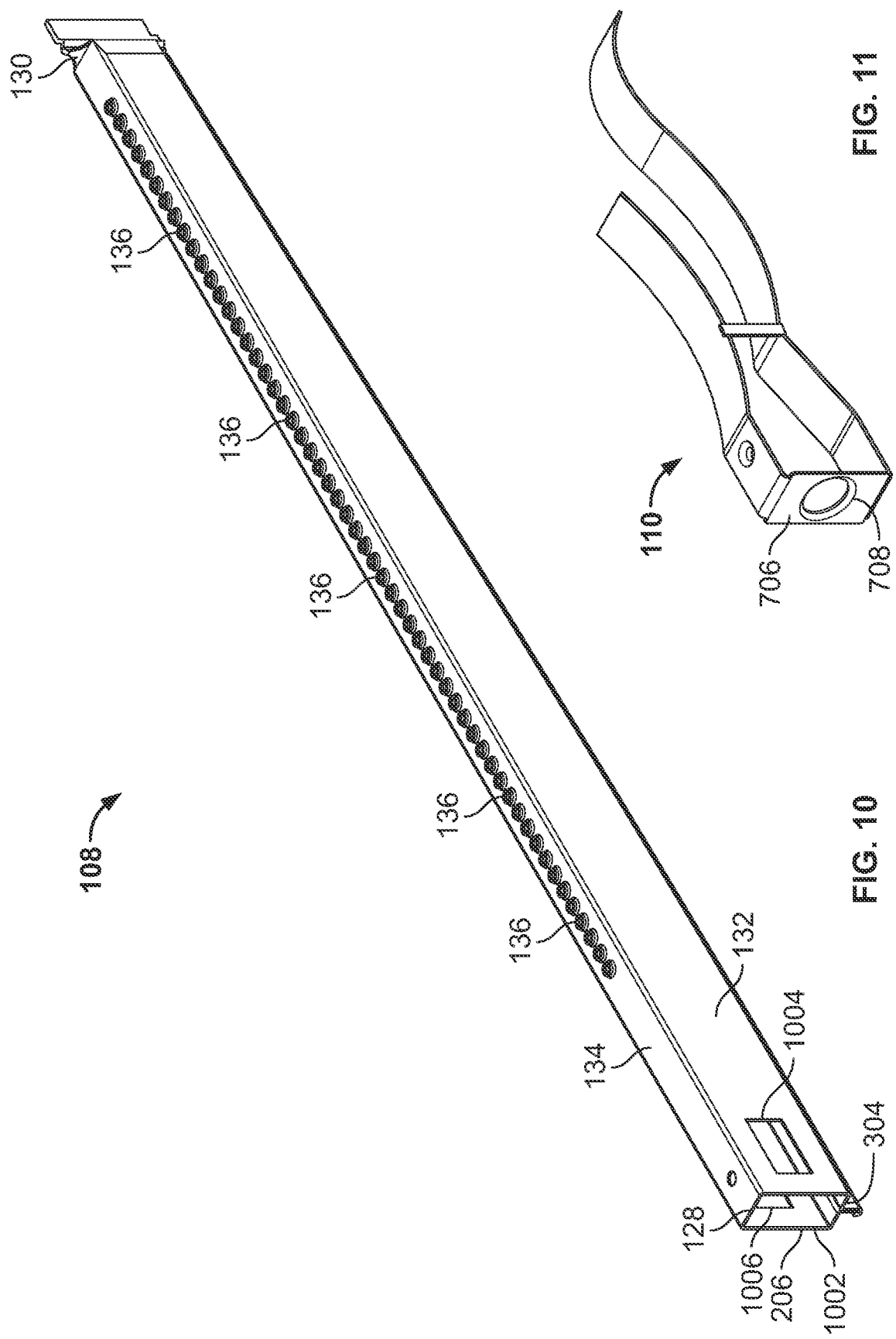

FIG. 22  SECTION A-A

OFF SETTING
Knob Position: 0° (OFF)
Left Burner Tube Heat Output: 0 BTU/hour
Right Burner Tube Heat Output: 0 BTU/hour
Combined Burner Tube Heat Output: 0 BTU/hour

HIGH SETTING
Knob Position: 90° CCW from OFF
Left Burner Tube Heat Output: 3,500 BTU/hour
Right Burner Tube Heat Output: 13,500 BTU/hour
Combined Burner Tube Heat Output: 17,000 BTU/hour

MEDIUM SETTING
Knob Position: 180° CCW from OFF
Left Burner Tube Heat Output: 3,500 BTU/hour
Right Burner Tube Heat Output: 6,000 BTU/hour
Combined Burner Tube Heat Output: 9,500 BTU/hour

LOW SETTING
Knob Position: 270° CCW from OFF
Left Burner Tube Heat Output: 3,500 BTU/hour
Right Burner Tube Heat Output: 0 BTU/hour
Combined Burner Tube Heat Output: 3,500 BTU/hour

DUAL-BURNER ASSEMBLIES FOR COOKBOXES OF GAS GRILLS

RELATED APPLICATIONS

This application claims priority to U.S. Provisional Patent Application No. 63/175,998, filed Apr. 16, 2021. The entirety of U.S. Provisional Patent Application No. 63/175,998 is hereby incorporated by reference herein.

FIELD OF THE DISCLOSURE

This disclosure relates generally to burners for cookboxes of gas grills and, more specifically, to dual-burner assemblies for cookboxes of gas grills.

BACKGROUND

Cookboxes of conventional gas grills are typically equipped with two or more atmospheric burners (e.g., burners that operate at atmospheric pressure and without forced induction) that are spaced apart from one another (e.g., a right burner and a left burner) and configured to provide zone-based heating within the cookbox. Atmospheric burners have existed for over one hundred years, and their use in gas-fueled outdoor cooking appliances is widely accepted.

For any given atmospheric burner design, there are natural limits to the "low" and the "high" operating settings. The "low" setting (e.g., the lowest flow rate at which an air/fuel mixture travels through the burner) is limited by the burner's ability to prevent flashback. The "high" setting (e.g., the highest flow rate at which an air/fuel mixture travels through the burner) is limited by the burner's ability to prevent flame lift and/or combustion outputs (e.g., non-combusted carbon, carbon monoxide content in exhaust). Thus, the low-energy setting and the high-energy setting of any given burner is set such that the individual burner, and the complete system of burners within the gas-fueled outdoor cooking appliance, operate within safe conditions.

For example, an individual burner of a Weber® Genesis II 310 model gas grill operates between a low setting of six thousand British Thermal Units per hour (6,000 BTU/hour) and a high setting of thirteen thousand five hundred British Thermal Units per hour (13,500 BTU/hour). The ratio between the high operational setting and the low operational setting of a burner is known as the "turndown ratio." In the above example, the individual burner of the Weber® Genesis II 310 model has a turndown ratio of 2.25, calculated by dividing the high operational setting (13,500 BTU/hour) by the low operational setting (6,000 BTU/hour).

When designing a burner for a gas-fueled outdoor cooking appliance, it is generally desirable to maximize the turndown ratio of the burner. Efforts to maximize the turndown ratio are typically bounded, however, by the above-described natural limits (e.g., the burner's ability to prevent flashback, and the burner's ability to prevent flame lift and/or combustion outputs), and/or by other design constraints.

BRIEF DESCRIPTION OF THE DRAWINGS

FIG. 2 is a top view of the dual-burner assembly of FIG. 1.

FIG. 3 is a bottom view of the dual-burner assembly of FIGS. 1 and 2.

FIG. 4 is a right side view of the dual-burner assembly of FIGS. 1-3.

FIG. 5 is a left side view of the dual-burner assembly of FIGS. 1-4.

FIG. 8 is an isolated perspective view of the first burner tube of the dual-burner assembly of FIGS. 1-5.

FIG. 9 is an isolated perspective view of the first venturi insert of the dual-burner assembly of FIGS. 1-5.

FIG. 10 is an isolated perspective view of the second burner tube of the dual-burner assembly of FIGS. 1-5.

FIG. 11 is an isolated perspective view of the second venturi insert of the dual-burner assembly of FIGS. 1-5.

Figure 1:
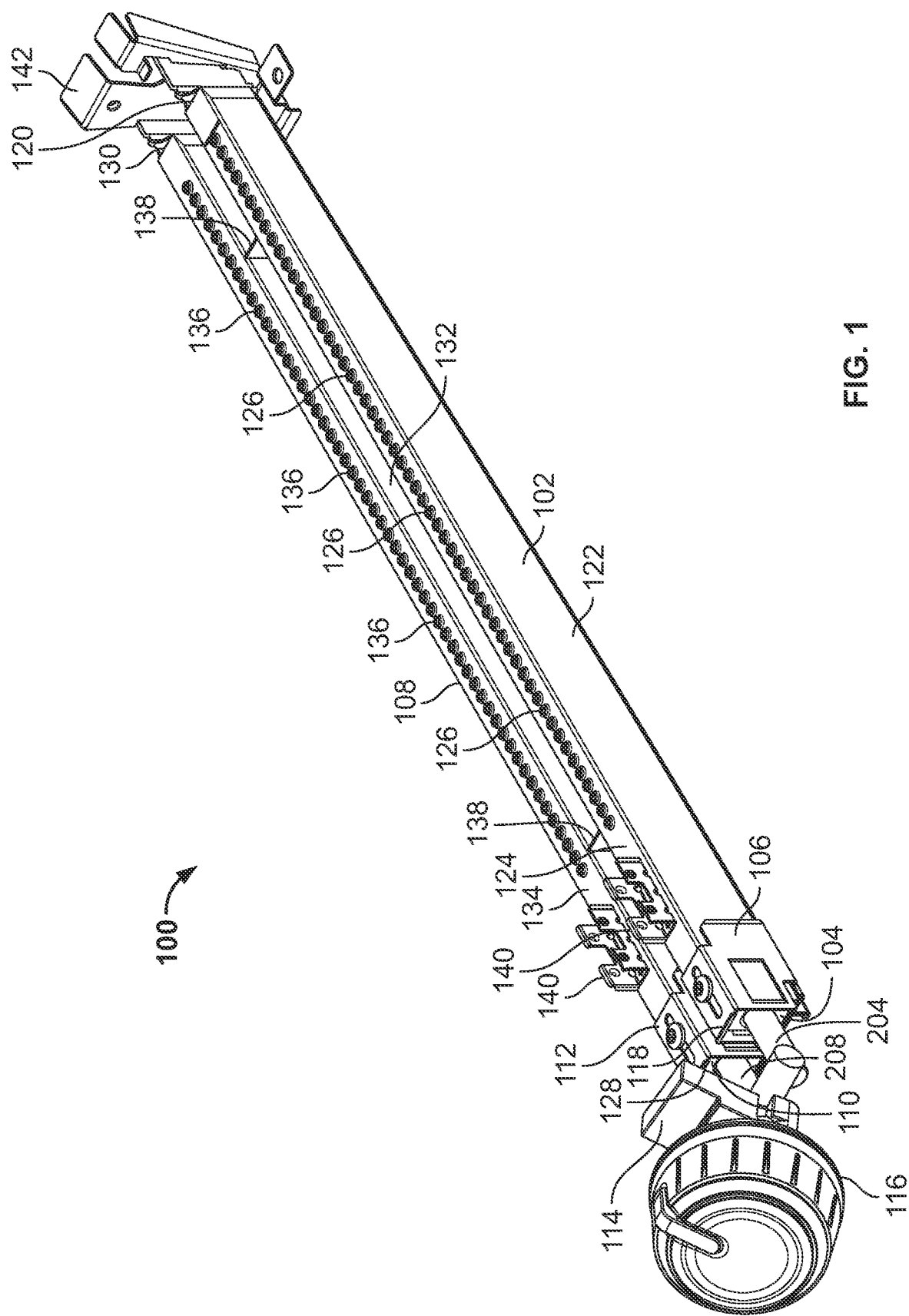
FIG. 1 is a perspective view of an example dual-burner assembly constructed in accordance with teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example dual-burner assemblies disclosed herein are configured to be implemented in gas-fueled outdoor cooking appliances, and, more specifically, in cookboxes of a gas grills. Example dual-burner assemblies disclosed herein are advantageously configured to provide operational heating ranges and associated turndown ratios that are significantly improved relative to the operational heating ranges and turndown ratios of known atmospheric burners for gas-fueled outdoor cooking appliances.

Example dual-burner assemblies disclosed herein include a first burner tube having a first maximum heat output, and a second burner tube having a second maximum heat output that is less than the first maximum heat output. In some examples, the second burner tube is spaced apart from the first burner tube by a distance of no more than 0.750 inches, and provides a concentrated heat output within a span of approximately 1.250 inches. In some such examples, the second burner tube is coupled to the first burner tube in a manner that defines and/or maintains the above-described spacing between the first and second burner tubes of the dual-burner assembly.

The dual heat outputs of the first and second burner tubes advantageously enable the dual-burner assembly to be operated over a broader range of temperatures than would otherwise be the case with a single atmospheric burner. In some examples, dual-burner assemblies disclosed herein are configured to operate with a low heat output of approximately 3,500 BTU/hour and a high heat output of approximately 17,000 BTU/hour, thereby providing an operational heating range of approximately 13,500 BTU/hour (e.g., 17,000-3,500=13,500), and a turndown ratio of approximately 4.86 (e.g., 17,000/3,500=4.86). By contrast, a known burner of the Weber® Genesis II 310 model gas grill operates with a low heat output of approximately 6,000 BTU/hour and a high heat output of approximately 13,500 BTU/hour, thereby providing an operational heating range of approximately 7,500 BTU/hour (e.g., 13,500-6,000=7,500), and a turndown ratio of approximately 2.25 (e.g., 13,500/6,000=2.25).

The improved operational heating range and turndown ratio associated with the disclosed dual-burner assemblies enable the dual-burner assembly to achieve higher energy levels (and thus higher cook temperatures) as well as lower energy levels (and thus lower cook temperatures) relative to known atmospheric burners. These improvements provide numerous advantages to the gas-fueled outdoor cooking appliance and the user experience associated therewith. For example, the higher energy levels achievable via the disclosed dual-burner assemblies significantly reduce the time needed to preheat the gas-fueled outdoor cooking appliance. As another example, when multiple instances of the disclosed dual-burner assemblies are implemented within a cookbox of a gas grill, the higher energy levels achievable via the disclosed dual-burner assemblies enable the entire cooking surface of the gas grill to be used for high-heat searing. As another example, when multiple instances of the disclosed dual-burner assemblies are implemented within a cookbox of a gas grill, the lower energy levels achievable via the disclosed dual-burner assemblies enable the entire cooking surface of the gas grill to be used for low-heat cooking, including simmering and smoking.

In some disclosed examples, the dual-burner assembly includes a single-inlet, dual-outlet valve that selectively distributes pressurized gas (e.g., received at the inlet of the valve) to the first and second burner tubes (e.g., via the first and second outlets of the valve) of the dual-burner assembly. Thus, a single consumer input (e.g., provided to the valve via a user-operated knob) can advantageously control the gas flow to both of the first and second burner tubes of the dual-burner assembly.

Dual-burner assemblies disclosed herein accordingly provide numerous enhancements for gas-fueled outdoor cooking appliances, and particularly for cookboxes of gas grills. The above-identified features as well as other advantageous features of example dual-burner assemblies disclosed herein are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

Figure 6:
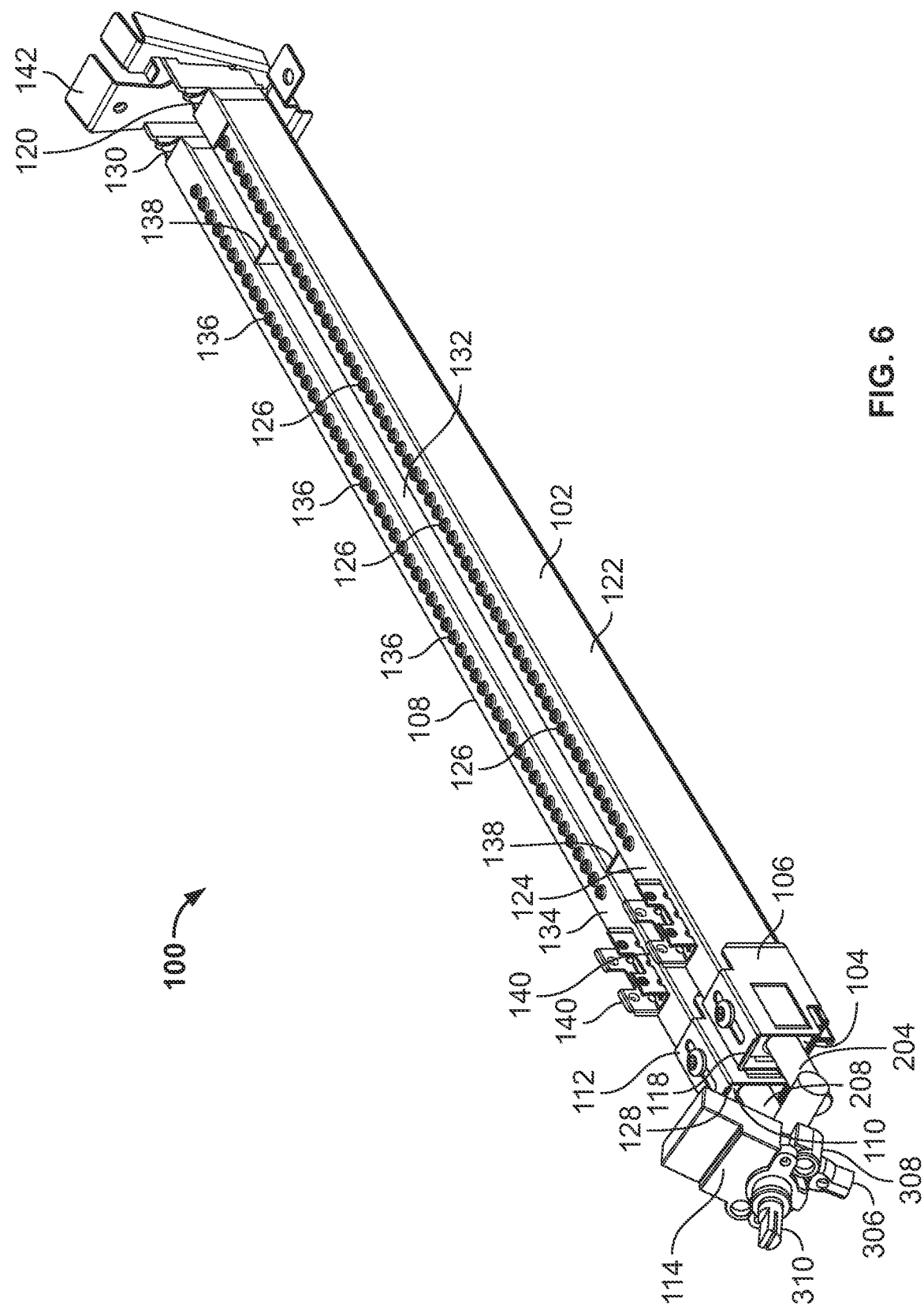
FIG. 6 is a perspective view of the dual-burner assembly of FIGS. 1-5, with the knob of the dual-burner assembly removed.
Figure 7:
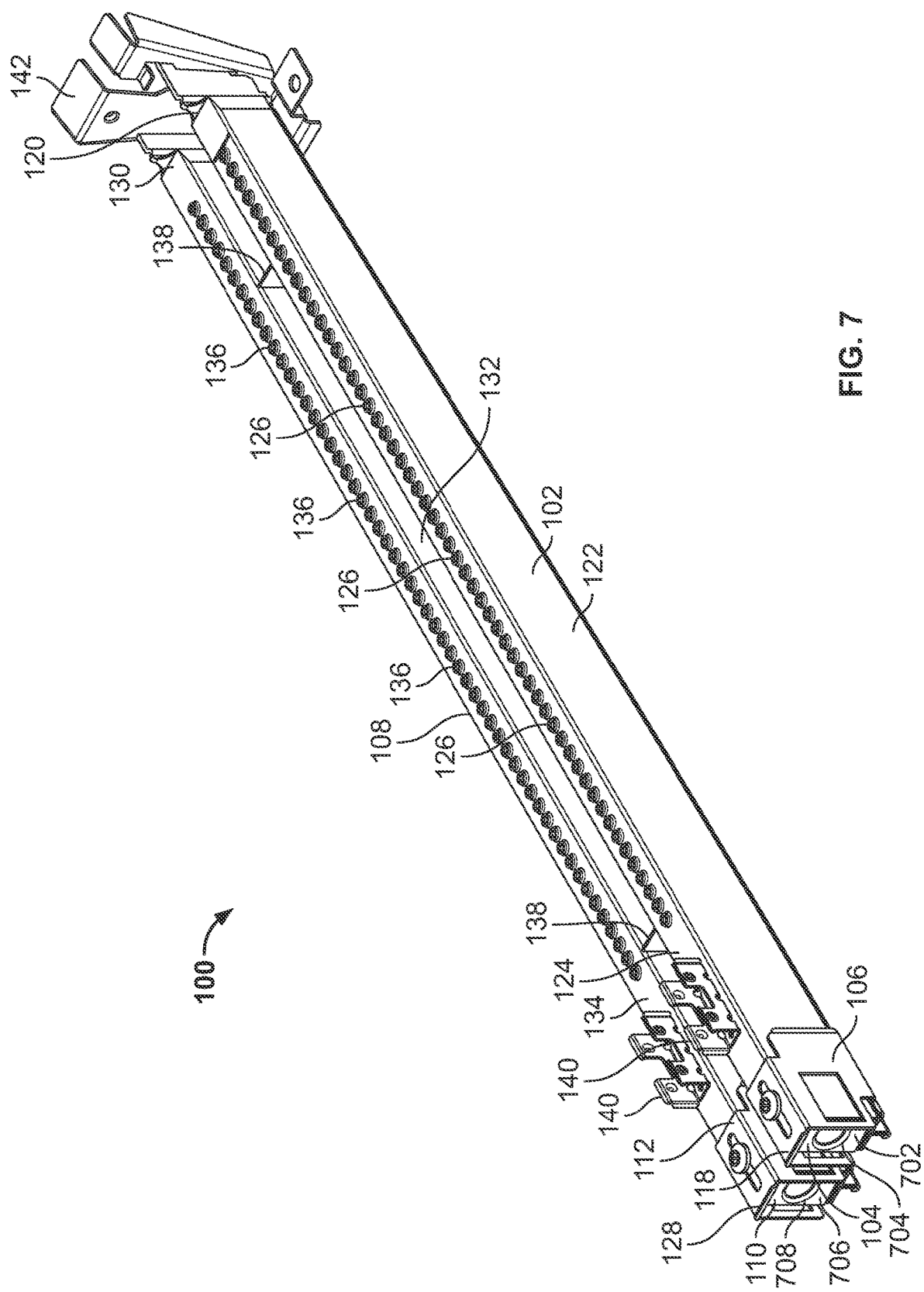
FIG. 7 is a perspective view of the dual-burner assembly of FIGS. 1-5, with both the knob and the valve of the dual-burner assembly removed.
Figure 13:
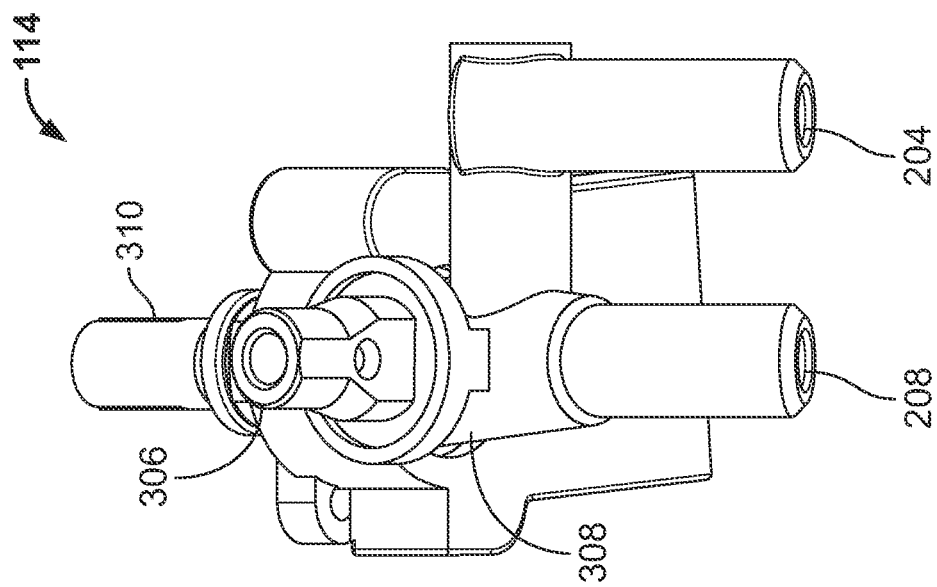
FIG. 13 is a second isolated perspective view of the valve of the dual-burner assembly of FIGS. 1-5.
Figure 12:
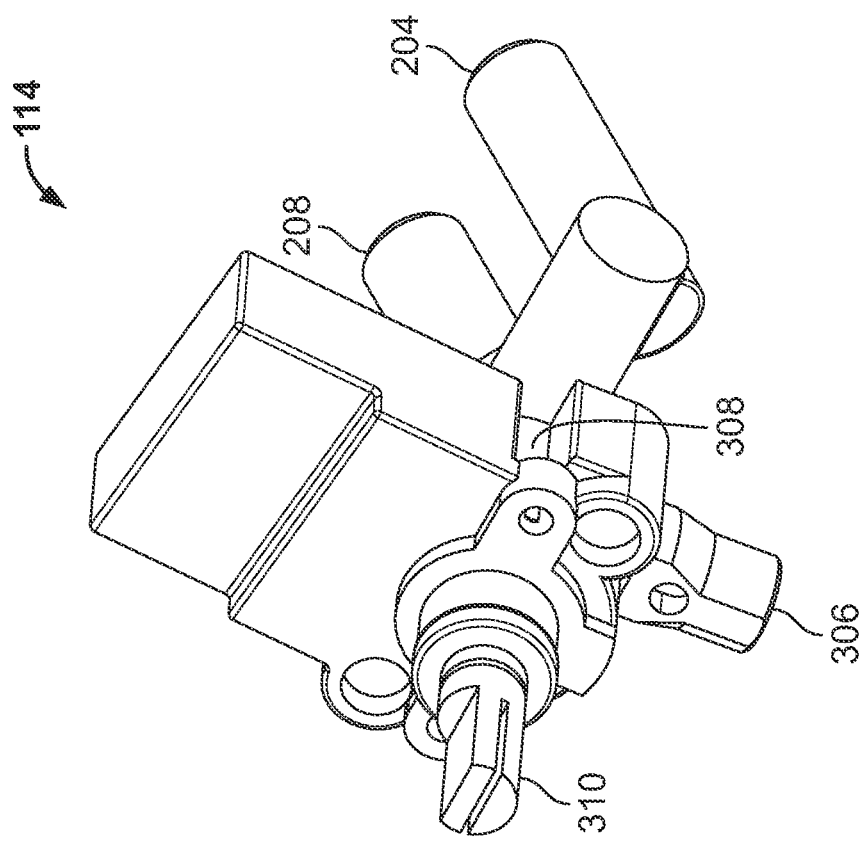
FIG. 12 is a first isolated perspective view of the valve of the dual-burner assembly of FIGS. 1-5.

FIG. 1 is a perspective view of an example dual-burner assembly 100 constructed in accordance with teachings of this disclosure. FIG. 2 is a top view of the dual-burner assembly 100 of FIG. 1. FIG. 3 is a bottom view of the dual-burner assembly 100 of FIGS. 1 and 2. FIG. 4 is a right side view of the dual-burner assembly 100 of FIGS. 1-3. FIG. 5 is a left side view of the dual-burner assembly 100 of FIGS. 1-4. In the illustrated example of FIGS. 1-5, the dual-burner assembly 100 includes an example first burner tube 102 (e.g., a right burner tube), an example first venturi insert 104, an example first air shutter 106, an example second burner tube 108 (e.g., a left burner tube), an example second venturi insert 110, an example second air shutter 112, an example valve 114, and an example knob 116. FIG. 6 is a perspective view of the dual-burner assembly 100 of FIGS. 1-5, with the knob 116 of the dual-burner assembly 100 removed. FIG. 7 is a perspective view of the dual-burner assembly 100 of FIGS. 1-5, with both the knob 116 and the valve 114 of the dual-burner assembly 100 removed. FIG. 8 is an isolated perspective view of the first burner tube 102 of the dual-burner assembly 100 of FIGS. 1-5. FIG. 9 is an isolated perspective view of the first venturi insert 104 of the dual-burner assembly 100 of FIGS. 1-5. FIG. 10 is an isolated perspective view of the second burner tube 108 of the dual-burner assembly 100 of FIGS. 1-5. FIG. 11 is an isolated perspective view of the second venturi insert 110 of the dual-burner assembly 100 of FIGS. 1-5. FIG. 12 is a first isolated perspective view of the valve 114 of the dual-burner assembly 100 of FIGS. 1-5. FIG. 13 is a second isolated perspective view of the valve 114 of the dual-burner assembly 100 of FIGS. 1-5.

The first burner tube 102 of FIGS. 1-8 includes an example front end 118, an example rear end 120, an example right wall 122, an example left wall 202, an example upper wall 124, and an example lower wall 302. The rear end 120 of the first burner tube 102 is located opposite the front end 118 of the first burner tube 102. The right wall 122 of the first burner tube 102 extends between the front end 118 and the rear end 120 of the first burner tube 102. The left wall 202 of the first burner tube 102 is located opposite the right wall 122 of the first burner tube 102 and extends between the front end 118 and the rear end 120 of the first burner tube 102. The upper wall 124 of the first burner tube 102 extends between the front end 118 and the rear end 120 of the first burner tube 102, and also extends between the right wall 122 and the left wall 202 of the first burner tube 102. The lower wall 302 of the first burner tube 102 is located opposite the upper wall 124 of the first burner tube 102, extends between the front end 118 and the rear end 120 of the first burner tube 102, and also extends between the right wall 122 and the left wall 202 of the first burner tube 102.

The first burner tube 102 has a length (L1) extending from the front end 118 to the rear end 120 of the first burner tube 102. In the illustrated example of FIGS. 1-8, the first burner tube 102 has a substantially linear shape (e.g., free of curves and/or bends) along the length (L1) of the first burner tube 102 between the front end 118 and the rear end 120 of the first burner tube 102. In other examples, the first burner tube 102 can alternatively include one or more curve(s) and/or bend(s) along the length (L1) of the first burner tube 102 between the front end 118 and the rear end 120 of the first burner tube 102.

The first burner tube 102 has a width (W1) extending from the right wall 122 to the left wall 202 of the first burner tube 102. In the illustrated example of FIGS. 1-8, the width (W1) of the first burner tube 102 is substantially constant (e.g., non-varying) along the length (L1) of the first burner tube 102 between the front end 118 and the rear end 120 of the first burner tube 102. In other examples, the width (W1) of the first burner tube 102 may vary along the length (L1) of the first burner tube 102 between the front end 118 and the rear end 120 of the first burner tube 102. The width (W1) of the first burner tube 102 is preferably between 0.500 and 0.750 inches. In the illustrated example of FIGS. 1-8 for instance, the width (W1) of the first burner tube 102 is approximately 0.550 inches. In other examples, the width (W1) of the first burner tube 102 can be less than 0.500 inches. In still other examples, the width (W1) of the first burner tube 102 can be greater than 0.750 inches.

The right wall 122, the left wall 202, the upper wall 124, and the lower wall 302 of the first burner tube 102 define an interior of the first burner tube 102. In the illustrated example of FIGS. 1-8, the interior of the first burner tube 102 has a substantially rectangular cross-sectional shape (e.g., defined by a plane parallel to the width (W1) of the first burner tube 102). In other examples, the interior of the first burner tube 102 can alternatively have a non-rectangular cross-sectional shape, including for example a circular cross-sectional shape, an elliptical cross-sectional shape, or a triangular cross-sectional shape, among others.

In some examples, the cross-sectional shape and/or the associated cross-sectional area of the interior of the first burner tube 102 remains constant along the length (L1) of the first burner tube 102 between the front end 118 and the rear end 120 of the first burner tube 102. In other examples, the cross-sectional shape and/or the associated cross-sectional area of the interior of the first burner tube 102 changes (e.g., increases or decreases) along the length (L1) of the first burner tube 102 between the front end 118 and the rear end 120 of the first burner tube 102. Changes in the cross-sectional shape and/or the associated cross-sectional area of the interior of the first burner tube 102 may be present, for example, when one or more of the right wall 122, the left wall 202, the upper wall 124, or the lower wall 302 of the first burner tube 102 tapers along the length (L1) of the first burner tube 102 between the front end 118 and the rear end 120 of the first burner tube 102.

The front end 118 of the first burner tube 102 of FIGS. 1-8 includes an example opening 802 configured to receive the first venturi insert 104 of the dual-burner assembly 100. In this regard, the first venturi insert 104 of the dual-burner assembly 100 is positioned and/or located within the first burner tube 102 of the dual-burner assembly 100 proximate the front end 118 of the first burner tube 102. The first venturi insert 104 includes an example front face 702 having an example opening 704 (e.g., a through hole) extending therethrough. The opening 704 of the first venturi insert 104 is configured to receive an example first outlet port 204 of the valve 114 of the dual-burner assembly 100, as further described herein.

The first venturi insert 104 is configured to receive gas from the first outlet port 204 of the valve 114, and to receive combustion air from an example opening 804 formed in the right wall 122 of the first burner tube 102 and/or from an example opening 806 formed in the left wall 202 of the first burner tube 102. The first venturi insert 104 increases the velocity of the received gas/air mixture as the mixture travels down the length (L1) of the first burner tube 102 from the front end 118 toward the rear end 120 of the first burner tube 102.

The first air shutter 106 of the dual-burner assembly 100 is coupled to the first burner tube 102 of the dual-burner assembly 100 proximate the front end 118 of the first burner tube 102. The first air shutter 106 is adjustable along the length (L1) of the first burner tube 102 such that the first air shutter 106 can increase or decrease the size of the opening 804 formed in the right wall 122 of the first burner tube 102 and/or the size of the opening 806 formed in the left wall 202 of the first burner tube 102. Positional adjustments of the first air shutter 106 relative to the first burner tube 102 accordingly modify the amount of combustion air in the gas/air mixture traveling through the first burner tube 102.

The upper wall 124 of the first burner tube 102 includes example ports 126 (e.g., through holes) extending therethrough. Flames generated and/or located within the interior of the first burner tube 102 are emitted from the first burner tube 102 through respective ones of the ports 126. In the illustrated example of FIGS. 1-8, respective ones of the ports 126 are aligned with one another, with the respective ones of the ports 126 being spaced apart from one another along the length (L1) of the first burner tube 102 between the front end 118 and the rear end 120 of the first burner tube 102. In other examples, respective ones of the ports 126 can alternatively be arranged in a different pattern relative to that shown in FIGS. 1-8, and/or can alternatively be located on the right wall 122 and/or the left wall 202 of the first burner tube 102.

The first burner tube 102 of FIGS. 1-8 is configured to have an associated maximum heat output. In some examples, the maximum heat output of the first burner tube 102 is preferably between 10,000 and 15,000 BTU/hour. In the illustrated example of FIGS. 1-8 for instance, the maximum heat output of the first burner tube 102 is approximately 13,500 BTU/hour. In other examples, the maximum heat output of the first burner tube 102 can be less than 10,000 BTU/hour. In still other examples, the maximum heat output of the first burner tube 102 can be greater than 15,000 BTU/hour.

The second burner tube 108 of FIGS. 1-7 and 10 includes an example front end 128, an example rear end 130, an example right wall 132, an example left wall 206, an example upper wall 134, and an example lower wall 304. The rear end 130 of the second burner tube 108 is located opposite the front end 128 of the second burner tube 108. The right wall 132 of the second burner tube 108 extends between the front end 128 and the rear end 130 of the second burner tube 108. The left wall 206 of the second burner tube 108 is located opposite the right wall 132 of the second burner tube 108 and extends between the front end 128 and the rear end 130 of the second burner tube 108. The upper wall 134 of the second burner tube 108 extends between the front end 128 and the rear end 130 of the second burner tube 108, and also extends between the right wall 132 and the left wall 206 of the second burner tube 108. The lower wall 304 of the second burner tube 108 is located opposite the upper wall 134 of the second burner tube 108, extends between the front end 128 and the rear end 130 of the second burner tube 108, and also extends between the right wall 132 and the left wall 206 of the second burner tube 108.

The second burner tube 108 has a length (L2) extending from the front end 128 to the rear end 130 of the second burner tube 108. In the illustrated example of FIGS. 1-7 and 10, the second burner tube 108 has a substantially linear shape (e.g., free of curves and/or bends) along the length (L2) of the second burner tube 108 between the front end 128 and the rear end 130 of the second burner tube 108. In other examples, the second burner tube 108 can alternatively include one or more curve(s) and/or bend(s) along the length (L2) of the second burner tube 108 between the front end 128 and the rear end 130 of the second burner tube 108.

The second burner tube 108 has a width (W2) extending from the right wall 132 to the left wall 206 of the second burner tube 108. In the illustrated example of FIGS. 1-7 and 10, the width (W2) of the second burner tube 108 is substantially constant (e.g., non-varying) along the length (L2) of the second burner tube 108 between the front end 128 and the rear end 130 of the second burner tube 108. In other examples, the width (W2) of the second burner tube 108 may vary along the length (L2) of the second burner tube 108 between the front end 128 and the rear end 130 of the second burner tube 108. The width (W2) of the second burner tube 108 is preferably between 0.500 and 0.750 inches. In the illustrated example of FIGS. 1-7 and 10 for instance, the width (W2) of the second burner tube 108 is approximately 0.550 inches. In other examples, the width (W2) of the second burner tube 108 can be less than 0.500 inches. In still other examples, the width (W2) of the second burner tube 108 can be greater than 0.750 inches.

The right wall 132, the left wall 206, the upper wall 134, and the lower wall 304 of the second burner tube 108 define an interior of the second burner tube 108. In the illustrated example of FIGS. 1-7 and 10, the interior of the second burner tube 108 has a substantially rectangular cross-sectional shape (e.g., defined by a plane parallel to the width (W2) of the second burner tube 108). In other examples, the interior of the second burner tube 108 can alternatively have a non-rectangular cross-sectional shape, including for example a circular cross-sectional shape, an elliptical cross-sectional shape, or a triangular cross-sectional shape, among others.

In some examples, the cross-sectional shape and/or the associated cross-sectional area of the interior of the second burner tube 108 remains constant along the length (L2) of the second burner tube 108 between the front end 128 and the rear end 130 of the second burner tube 108. In other examples, the cross-sectional shape and/or the associated cross-sectional area of the interior of the second burner tube 108 changes (e.g., increases or decreases) along the length (L2) of the second burner tube 108 between the front end 128 and the rear end 130 of the second burner tube 108. Changes in the cross-sectional shape and/or the associated cross-sectional area of the interior of the second burner tube 108 may be present, for example, when one or more of the right wall 132, the left wall 206, the upper wall 134, or the lower wall 304 of the second burner tube 108 tapers along the length (L2) of the second burner tube 108 between the front end 128 and the rear end 130 of the second burner tube 108.

The front end 128 of the second burner tube 108 of FIGS. 1-7 and 10 includes an example opening 1002 configured to receive the second venturi insert 110 of the dual-burner assembly 100. In this regard, the second venturi insert 110 of the dual-burner assembly 100 is positioned and/or located within the second burner tube 108 of the dual-burner assembly 100 proximate the front end 128 of the second burner tube 108. The second venturi insert 110 includes an example front face 706 having an example opening 708 (e.g., a through hole) extending therethrough. The opening 708 of the second venturi insert 110 is configured to receive an example second outlet port 208 of the valve 114 of the dual-burner assembly 100, as further described herein.

The second venturi insert 110 is configured to receive gas from the second outlet port 208 of the valve 114, and to receive combustion air from an example opening 1004 formed in the right wall 132 of the second burner tube 108 and/or from an example opening 1006 formed in the left wall 206 of the second burner tube 108. The second venturi insert 110 increases the velocity of the received gas/air mixture as the mixture travels down the length (L2) of the second burner tube 108 from the front end 128 toward the rear end 130 of the second burner tube 108.

The second air shutter 112 of the dual-burner assembly 100 is coupled to the second burner tube 108 of the dual-burner assembly 100 proximate the front end 128 of the second burner tube 108. The second air shutter 112 is adjustable along the length (L2) of the second burner tube 108 such that the second air shutter 112 can increase or decrease the size of the opening 1004 formed in the right wall 132 of the second burner tube 108 and/or the size of the opening 1006 formed in the left wall 206 of the second burner tube 108. Positional adjustments of the second air shutter 112 relative to the second burner tube 108 accordingly modify the amount of combustion air in the gas/air mixture traveling through the second burner tube 108.

The upper wall 134 of the second burner tube 108 includes example ports 136 (e.g., through holes) extending therethrough. Flames generated and/or located within the interior of the second burner tube 108 are emitted from the second burner tube 108 through respective ones of the ports 136. In the illustrated example of FIGS. 1-7 and 10, respective ones of the ports 136 are aligned with one another, with the respective ones of the ports 136 being spaced apart from one another along the length (L2) of the second burner tube 108 between the front end 128 and the rear end 130 of the second burner tube 108. In other examples, respective ones of the ports 136 can alternatively be arranged in a different pattern relative to that shown in FIGS. 1-7 and 10, and/or can alternatively be located on the right wall 132 and/or the left wall 206 of the second burner tube 108.

The second burner tube 108 of FIGS. 1-7 and 10 is configured to have an associated maximum heat output. In some examples, the maximum heat output of the second burner tube 108 is preferably between 3,000 and 5,000 BTU/hour. In the illustrated example of FIGS. 1-7 and 10 for instance, the maximum heat output of the second burner tube 108 is approximately 3,500 BTU/hour. In other examples, the maximum heat output of the second burner tube 108 can be less than 3,000 BTU/hour. In still other examples, the maximum heat output of the second burner tube 108 can be greater than 5,000 BTU/hour.

In the illustrated example of FIGS. 1-5, the dual-burner assembly 100 is configured such that the maximum heat output of the second burner tube 108 is less than the maximum heat output of the first burner tube 102. In other examples, the dual-burner assembly 100 can alternatively be configured such that the maximum heat output of the second burner tube 108 is greater than the maximum heat output of the first burner tube 102. In still other examples, the dual-burner assembly 100 can alternatively be configured such that the maximum heat output of the second burner tube 108 is approximately equal to the maximum heat output of the first burner tube 102.

In the illustrated example of FIGS. 1-5, the first burner tube 102 has a relatively higher maximum heat output of 13,500 BTU/hour, while the second burner tube 108 has a relatively lower maximum heat output of only 3,500 BTU/hour. In such an example, the dual-burner assembly 100 is configured to operate with a low heat output of approximately 3,500 BTU/hour and a high heat output of approximately 17,000 BTU/hour, thereby providing an operational heating range of approximately 13,500 BTU/hour (e.g., 17,000-3,500=13,500), and a turndown ratio of approximately 4.86 (e.g., 17,000/3,500=4.86). In some examples, the operational heating range of the dual-burner assembly 100 is preferably no less than 10,000 BTU/hour, and the turndown ratio of the dual-burner assembly 100 is preferably no less than 3.00. In other examples, the operational heating range of the dual-burner assembly 100 can be less than 10,000 BTU/hour, and/or the turndown ratio of the dual-burner assembly 100 can be less than 3.00.

The valve 114 of FIGS. 1-6, 12 and 13 is structured as a single-input, dual-output valve. In this regard, the valve 114 includes the first outlet port 204, the second outlet port 208, and an example inlet port 306. The first outlet port 204 of the valve 114 extends through the opening 704 of the first venturi insert 104 and/or through the opening 802 of the front end 118 of the first burner tube 102 such that the first outlet port 204 if the valve 114 is in fluid communication with the interior of the first burner tube 102. Similarly, the second outlet port 208 of the valve 114 extends through the opening 708 of the second venturi insert 110 and/or through the opening 1002 of the front end 128 of the second burner tube 108 such that the second outlet port 208 of the valve 114 is in fluid communication with the interior of the second burner tube 108.

The inlet port 306 of the valve 114 is in selective fluid communication with the first outlet port 204 and the second outlet port 208 of the valve 114, with such selective fluid communication being determined based on the position of a flow control member located within an example body 308 of the valve 114. For example, the flow control member of the valve 114 can be placed in a first position such that gas (e.g., received from a gas distribution manifold) entering and/or passing through the inlet port 306 of the valve 114 is blocked and/or otherwise prevented from passing to both the first outlet port 204 and the second outlet port 208 of the valve 114 (e.g., an OFF state of the dual-burner assembly 100). As another example, the flow control member of the valve 114 can be placed in a second position such that gas entering and/or passing through the inlet port 306 of the valve 114 passes fully to both the first outlet port 204 and the second outlet port 208 of the valve 114 (e.g., a HIGH state of the dual-burner assembly 100). As another example, the flow control member of the valve 114 can be placed in a third position such that gas entering and/or passing through the inlet port 306 of the valve 114 passes only partially to the first outlet port 204 of the valve 114, but passes fully to the second outlet port 208 of the valve 114 (e.g., a MEDIUM state of the dual-burner assembly 100). As another example, the flow control member of the valve 114 can be placed in a fourth position such that gas entering and/or passing through the inlet port 306 of the valve 114 is blocked and/or otherwise prevented from passing to the first outlet port 204 of the valve 114, but passes fully to the second outlet port 208 of the valve 114 (e.g., a LOW state of the dual-burner assembly 100).

The valve 114 of FIGS. 1-6, 12, and 13 further includes an example stem 310 that is mechanically coupled to the flow control member of the valve 114. Movement of the flow control member of the valve 114 between the above-described positions can be facilitated by rotating the stem 310 of the valve 114 to a position that corresponds to the desired use position of the flow control member of the valve 114. In this regard, the knob 116 of FIGS. 1-5 includes an example shaft 312 configured to receive the stem 310 of the valve 114 such that the knob 116 is mechanically coupled to the stem 310 and/or operatively coupled to the flow control member of the valve 114. Thus, movement of the flow control member of the valve 114 between the above-described positions can be facilitated by rotating the knob 116 to a position that corresponds to the desired use position of the flow control member of the valve 114. In some examples, the knob 116 of FIGS. 1-5 includes indicia, markings, and/or labeling configured to assist a user in determining when the knob 116 is rotated to a position corresponding to the desired use position of the flow control member of the valve 114. For example, the knob 116 can include indicia, markings, and/or labeling configured to assist a user in determining when the knob 116 is rotated to a position corresponding to the OFF state, the HIGH state, the MEDIUM state, and/or the LOW state of the flow control member of the valve 114 and/or, more generally, of the dual-burner assembly 100.

As shown in FIGS. 1-7, the first burner tube 102 and the second burner tube 108 of the dual-burner assembly 100 are positioned in a side-by-side arrangement relative to one another such that the first burner tube 102 is parallel to the second burner tube 108. The first burner tube 102 and the second burner tube 108 are configured to be spaced apart from one another by a distance (D) measured between the left wall 202 of the first burner tube 102 and the right wall 132 of the second burner tube 108. In some examples, the distance (D) between the first burner tube 102 and the second burner tube 108 is preferably between 0.187 and 0.750 inches. In the illustrated example of FIGS. 1-7 for instance, the distance (D) between the first burner tube 102 and the second burner tube 108 is approximately 0.300 inches. In other examples, the distance (D) between the first burner tube 102 and the second burner tube 108 can be less than 0.187 inches. In still other examples, the distance (D) between the first burner tube 102 and the second burner tube 108 can be greater than 0.750 inches.

In view of their side-by-side arrangement described above, the first burner tube 102 and the second burner tube 108 of the dual-burner assembly 100 have a combined width (W) (e.g., a combined lateral extent) measured from the right wall 122 of the first burner tube 102 to the left wall 206 of the second burner tube 108. The combined width (W) of the first burner tube 102 and the second burner tube 108 can alternatively be measured as the sum of the width (W1) of the first burner tube 102, the width (W2) of the second burner tube 108, and the distance (D) between the first burner tube 102 and the second burner tube 108. In some examples, the combined width (W) of the first burner tube 102 and the second burner tube 108 is preferably between 1.367 and 2.000 inches. In the illustrated example of FIGS. 1-7 for instance, the combined width (W) of the first burner tube 102 and the second burner tube 108 is approximately 1.490 inches. In other examples, the combined width (W) of the first burner tube 102 and the second burner tube 108 can be less than 1.367 inches. In still other examples, the combined width (W) of the first burner tube 102 and the second burner tube 108 can be greater than 2.000 inches.

The dual-burner assembly 100 of FIGS. 1-7 further includes example bridging flanges 138 configured to couple the first burner tube 102 of the dual-burner assembly 100 to the second burner tube 108 of the dual-burner assembly 100. In the illustrated example of FIGS. 1-7, two separate (e.g., spaced apart) bridging flanges 138 are shown extending between the left wall 202 of the first burner tube 102 and the right wall 132 of the second burner tube 108. In other examples, the dual-burner assembly 100 can include a number of bridging flanges 138 other than two (e.g., 1, 3, 4, etc.). In still other examples, the dual-burner assembly 100 may not include any bridging flanges 138.

The dual-burner assembly 100 of FIGS. 1-7 further includes example front mounting brackets 140 configured to couple the first burner tube 102 of the dual-burner assembly 100 and/or the second burner tube 108 of the dual-burner assembly 100 to a component (e.g., a cookbox, a manifold, a control panel, a trim panel, etc.) of a grill implementing the dual-burner assembly 100. In the illustrated example of FIGS. 1-7, a first one of the front mounting brackets 140 is shown coupled to the upper wall 124 of the first burner tube 102, and a second one of the front mounting brackets 140 is shown coupled to the upper wall 134 of the second burner tube 108. In other examples, the first one of the front mounting brackets 140 coupled to the upper wall 124 of the first burner tube 102, and/or the second one of the front mounting brackets 140 coupled to the upper wall 134 of the second burner tube 108 can be omitted from the dual-burner assembly 100.

The dual-burner assembly 100 of FIGS. 1-7 further includes an example rear mounting bracket 142 configured to couple the first burner tube 102 of the dual-burner assembly 100 and/or the second burner tube 108 of the dual-burner assembly 100 to a component (e.g., a cookbox, a trim panel, etc.) of a grill implementing the dual-burner assembly 100. In the illustrated example of FIGS. 1-7, a tab extending from the rear end 120 of the first burner tube 102 is coupled to (e.g., disposed within) a slot formed in the rear mounting bracket 142. In other examples, the rear end 130 of the second burner tube 108 can additionally or alternatively be coupled to the rear mounting bracket 142. In still other examples, the rear mounting bracket 142 can be omitted from the dual-burner assembly 100.

Figure 14:
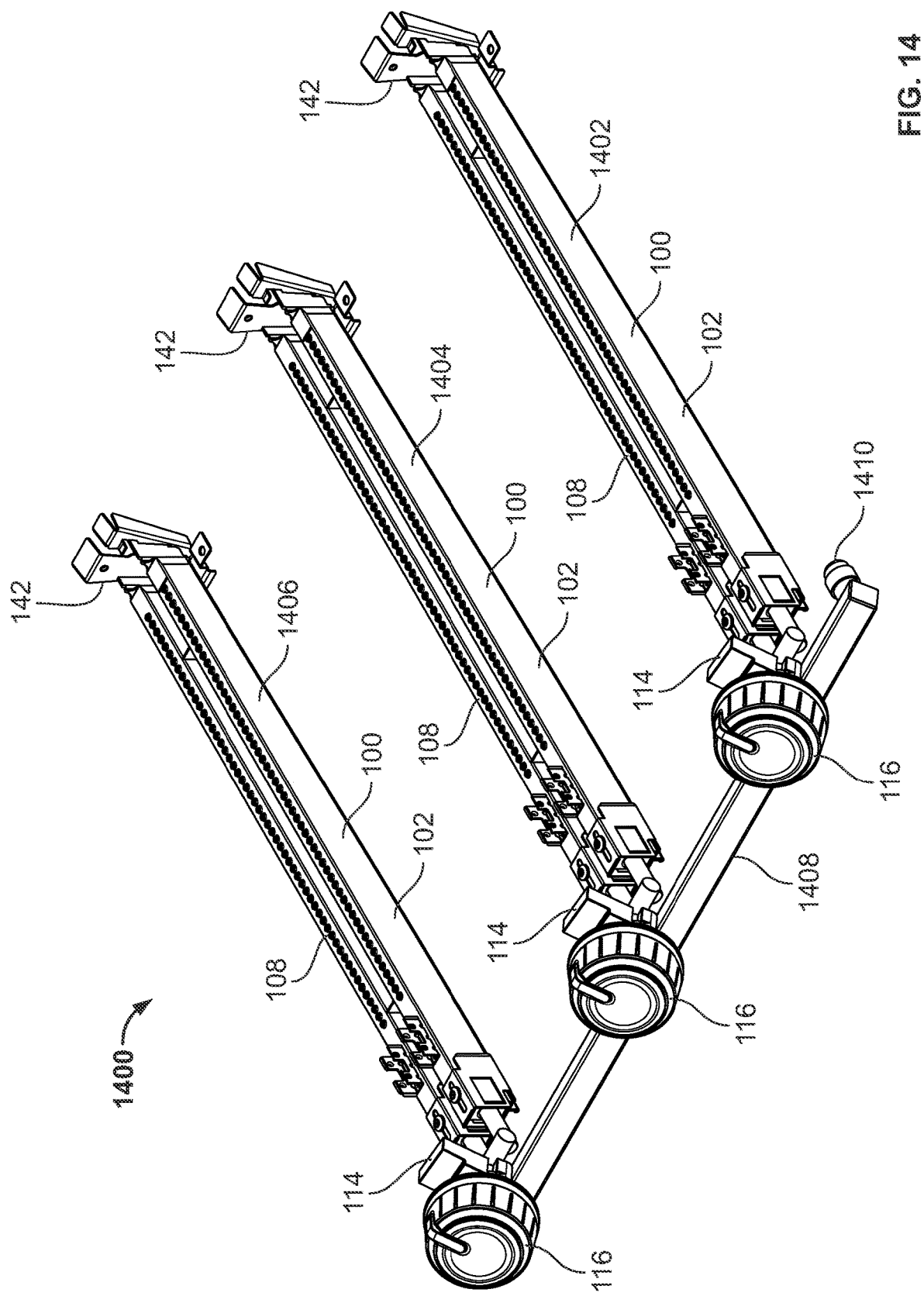
FIG. 14 is a perspective view of an example gas burner assembly including the dual-burner assembly of FIGS. 1-5.
Figure 15:
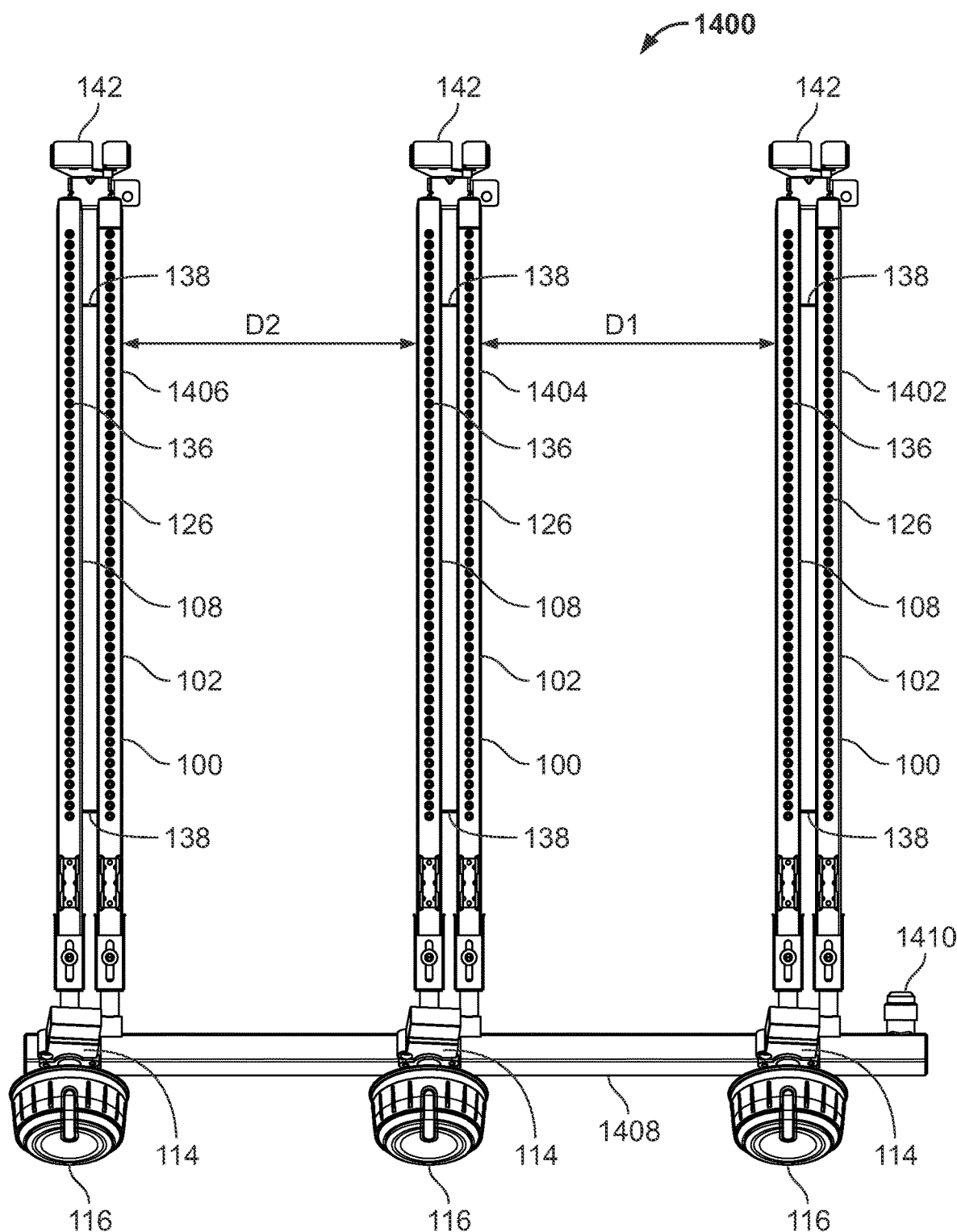
FIG. 15 is a top view of the gas burner assembly of FIG. 14.

FIG. 14 is a perspective view of an example gas burner assembly 1400 including the dual-burner assembly 100 of FIGS. 1-5. FIG. 15 is a top view of the gas burner assembly 1400 of FIG. 14. The gas burner assembly 1400 of FIGS. 14-15 includes three instances of the above-described dual-burner assembly 100 of FIGS. 1-5. More specifically, the gas burner assembly 1400 of FIGS. 14-15 includes an example right dual-burner assembly 1402, and example central dual-burner assembly 1404, and an example left dual-burner assembly 1406, each of which is implemented in a manner consistent with the dual-burner assembly 100 of FIGS. 1-5 described above. In other examples, the gas burner assembly 1400 of FIGS. 14-15 can alternatively include a different number (e.g., 1, 2, 4, 5, etc.) of instances of the dual-burner assembly 100 of FIGS. 1-5. Furthermore, in some examples, the gas burner assembly 1400 of FIGS. 14-15 can include one or more other type(s) of burner assemblies in addition to those shown in FIGS. 14-15. For example, the gas burner assembly 1400 can include one or more other type(s) of burner assemblies positioned between the right dual-burner assembly 1402 and the central dual-burner assembly 1404, between the central dual-burner assembly 1404 and the left dual-burner assembly 1406, and/or between the right dual-burner assembly 1402 and the left dual-burner assembly 1406.

In the illustrated example of FIGS. 14-15, the right dual-burner assembly 1402 is configured to be spaced apart from the central dual-burner assembly 1404 by a first distance (D1), and the central dual-burner assembly 1404 is configured to be spaced apart from the left dual-burner assembly 1406 by a second distance (D2). In some examples, the first distance (D1) and the second distance (D2) are, respectively, preferably at least 2.00 inches. In the illustrated example of FIGS. 14-15 for instance, the first distance (D1) and the second distance (D2) are, respectively, approximately 7.00 inches.

As shown in FIGS. 14-15, the right dual-burner assembly 1402, the central dual-burner assembly 1404, and the left dual-burner assembly 1406 are respectively coupled to (e.g., in fluid communication with) an example gas distribution manifold 1408 of the gas burner assembly 1400. In this regard, each of the right dual-burner assembly 1402, the central dual-burner assembly 1404, and the left dual-burner assembly 1406 includes an instance of the above-described valve 114 of the dual-burner assembly 100, with the inlet port 306 of the valve 114 being coupled to (e.g., in fluid communication with) the gas distribution manifold 1408 of the gas burner assembly 1400 of FIGS. 14-15. The gas distribution manifold 1408 includes an example inlet port 1410 configured to receive pressurized gas from a gas source (e.g., a propane cylinder, a gas line, etc.). The gas distribution manifold 1408 routes and/or distributes pressurized gas received at the inlet port 1410 of the gas distribution manifold 1408 to each of the right dual-burner assembly 1402, the central dual-burner assembly 1404, and the left dual-burner assembly 1406 of the gas burner assembly 1400 of FIGS. 14-15.

Figure 16:
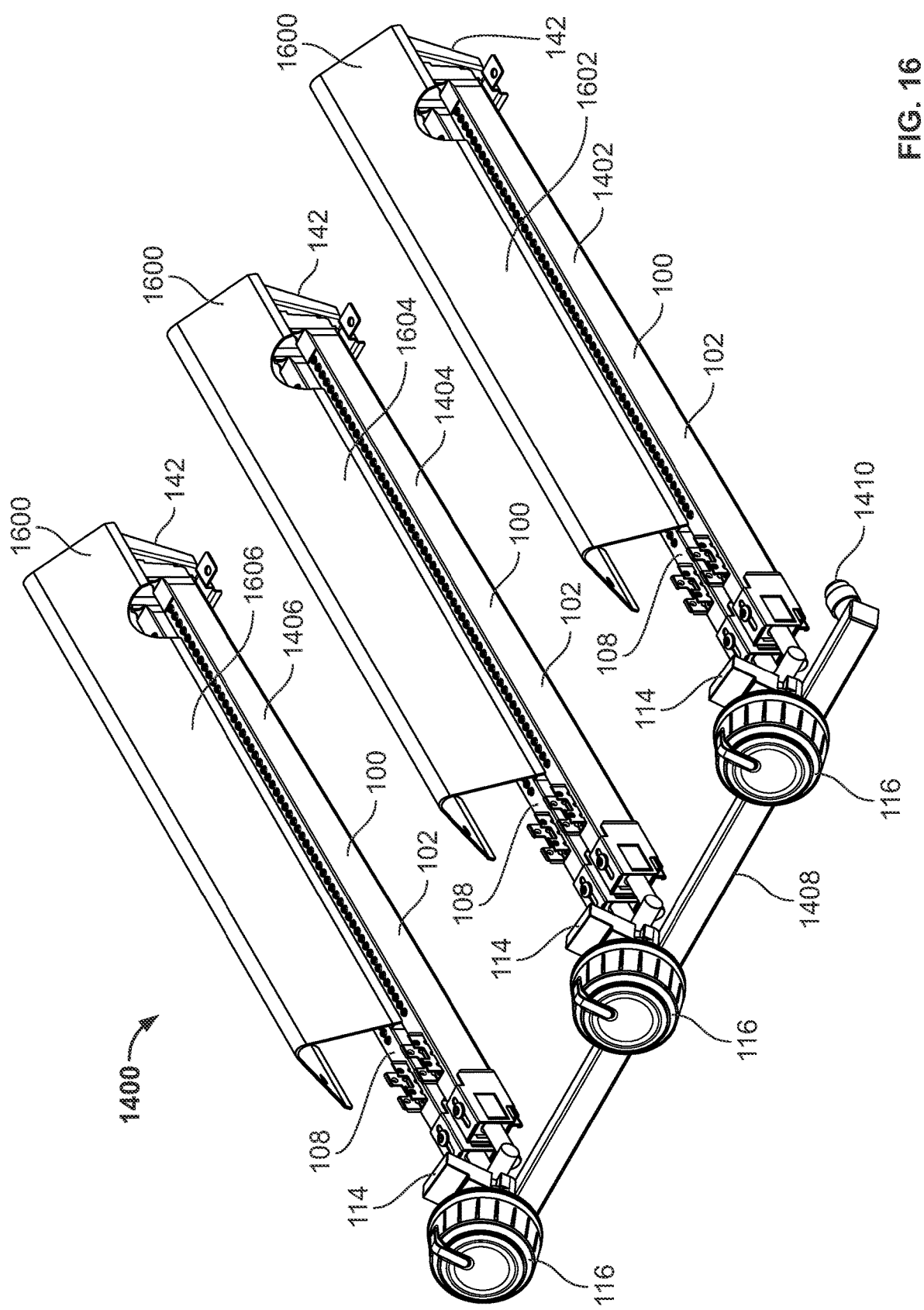
FIG. 16 is a perspective view of the gas burner assembly of FIGS. 14 and 15, with example grease deflection bars shown positioned over each dual-burner assembly of the gas burner assembly.
Figure 17:
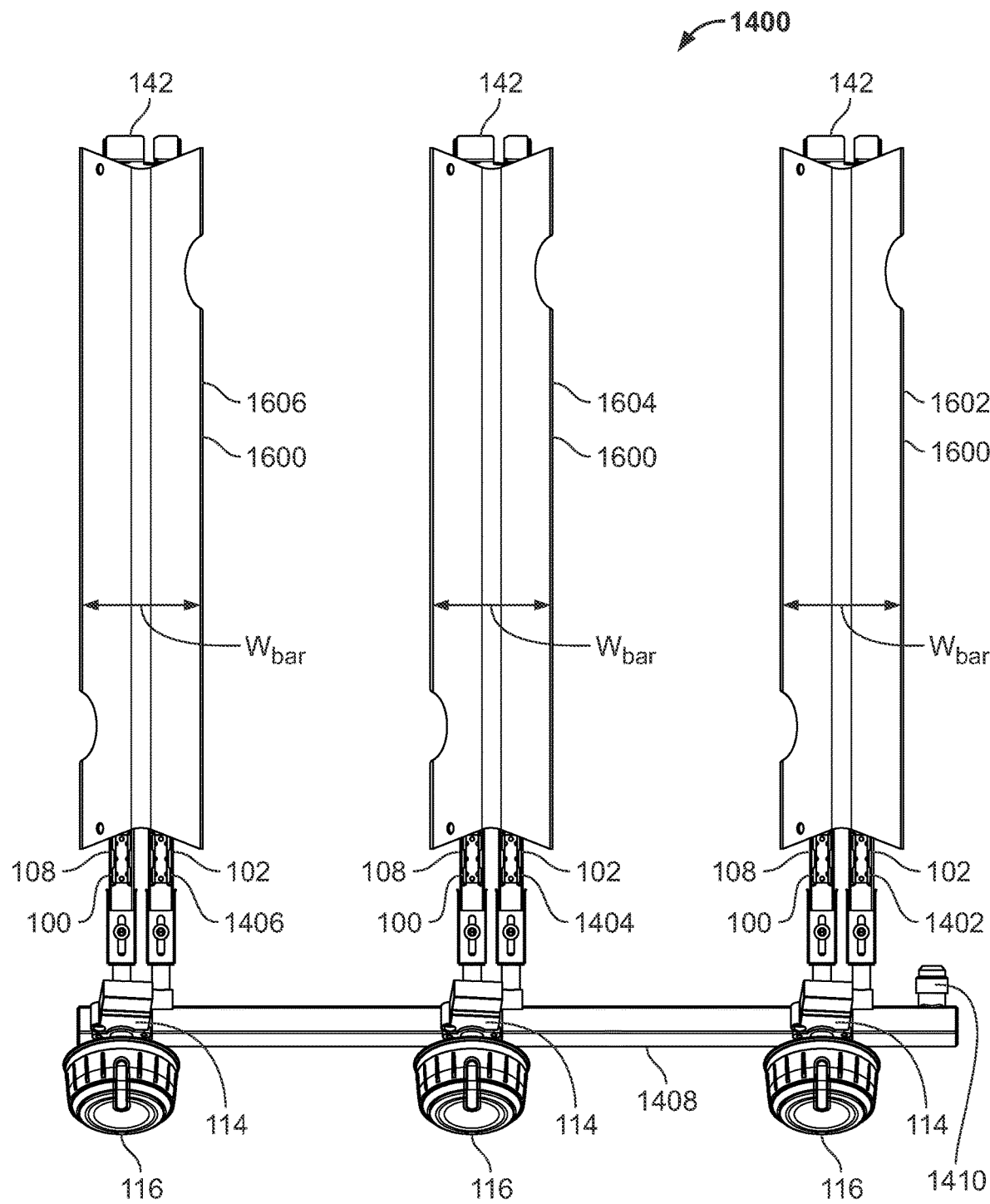
FIG. 17 is a top view of the gas burner assembly of FIGS. 14-16, with the grease deflection bars of FIG. 16 shown positioned over each dual-burner assembly of the gas burner assembly.

FIG. 16 is a perspective view of the gas burner assembly 1400 of FIGS. 14 and 15, with example grease deflection bars 1600 shown positioned over each dual-burner assembly 100 of the gas burner assembly 1400. FIG. 17 is a top view of the gas burner assembly 1400 of FIGS. 14-16, with the grease deflection bars 1600 of FIG. 16 shown positioned over each dual-burner assembly 100 of the gas burner assembly 1400. In the illustrated example of FIGS. 16-17, the grease deflection bars 1600 includes an example first grease deflection bar 1602 positioned over the right dual-burner assembly 1402 of the gas burner assembly 1400, an example second grease deflection bar 1604 positioned over the central dual-burner assembly 1404 of the gas burner assembly 1400, and an example third grease deflection bar 1606 positioned over the left dual-burner assembly 1406 of the gas burner assembly 1400. In other examples, the first grease deflection bar 1602, the second grease deflection bar 1604, or the third grease deflection bar 1606 can be omitted from among the illustrated grease deflection bars 1600 of FIGS. 16-17. In still other examples, the grease deflection bars 1600 can include one or more other grease deflection bar(s) in addition to the first grease deflection bar 1602, the second grease deflection bar 1604, and the third grease deflection bar 1606 shown in FIGS. 16-17.

The grease deflection bars 1600 of FIGS. 16-17 are respectively configured to prevent grease from dripping onto and/or into the ports 126 of the first burner tube 102 and the ports 136 of the second burner tube 108 included among each corresponding dual-burner assembly 100 of the gas burner assembly 1400 of FIGS. 14-17. In the illustrated example of FIGS. 16-17, the first grease deflection bar 1602, the second grease deflection bar 1604, and the third grease deflection bar 1606 are respectively configured to have an inverted V-shaped cross-sectional profile, including a peak that is generally centered over and oriented away from the corresponding dual-burner assembly above which the grease deflection bar is positioned. As further shown in FIGS. 16-17, the first grease deflection bar 1602, the second grease deflection bar 1604, and the third grease deflection bar 1606 are respectively configured to have a width ($W_{bar}$) (e.g., a lateral extent) that exceeds the combined width (W) (e.g., the combined lateral extent) of the corresponding dual-burner assembly over which the grease deflection bar is positioned.

For example, as shown in FIGS. 16-17, the width ($W_{bar}$) of the first grease deflection bar 1602 exceeds the combined width (W) of the right dual-burner assembly 1402 over which the first grease deflection bar 1602 is positioned. The ports 126 of the first burner tube 102 of the right dual-burner assembly 1402 and the ports 136 of the second burner tube 108 of the right dual-burner assembly 1402 are accordingly both covered by the first grease deflection bar 1602. Similarly, the width ($W_{bar}$) of the second grease deflection bar 1604 exceeds the combined width (W) of the central dual-burner assembly 1404 over which the second grease deflection bar 1604 is positioned. The ports 126 of the first burner tube 102 of the central dual-burner assembly 1404 and the ports 136 of the second burner tube 108 of the central dual-burner assembly 1404 are accordingly both covered by the second grease deflection bar 1604. Similarly, the width ($W_{bar}$) of the third grease deflection bar 1606 exceeds the combined width (W) of the left dual-burner assembly 1406 over which the third grease deflection bar 1606 is positioned. The ports 126 of the first burner tube 102 of the left dual-burner assembly 1406 and the ports 136 of the second burner tube 108 of the left dual-burner assembly 1406 are accordingly both covered by the third grease deflection bar 1606.

Figure 18:
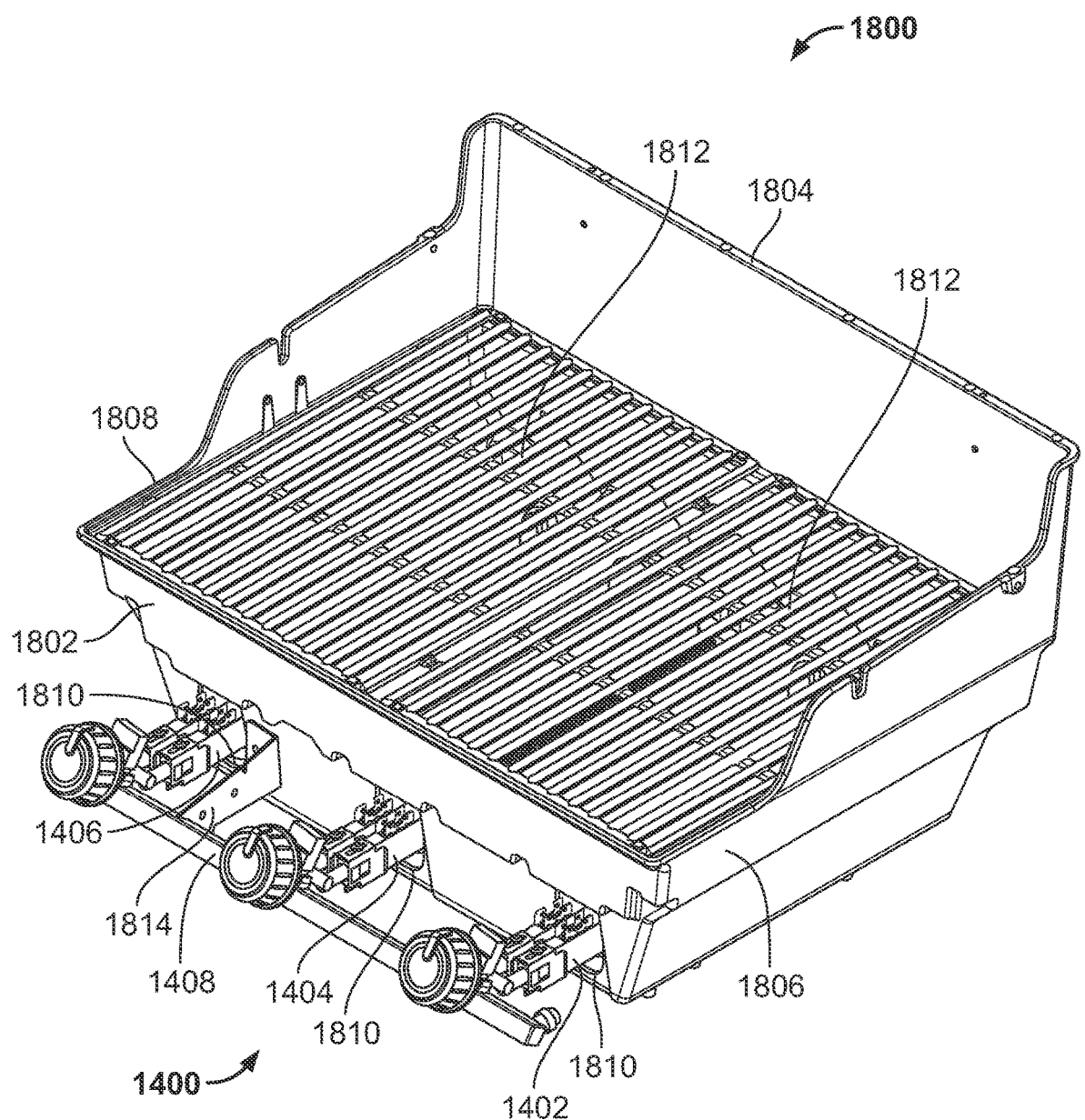
FIG. 18 is a perspective view of an example cookbox of a gas grill, with the gas burner assembly of FIGS. 14-17 shown coupled to the cookbox.
Figure 19:
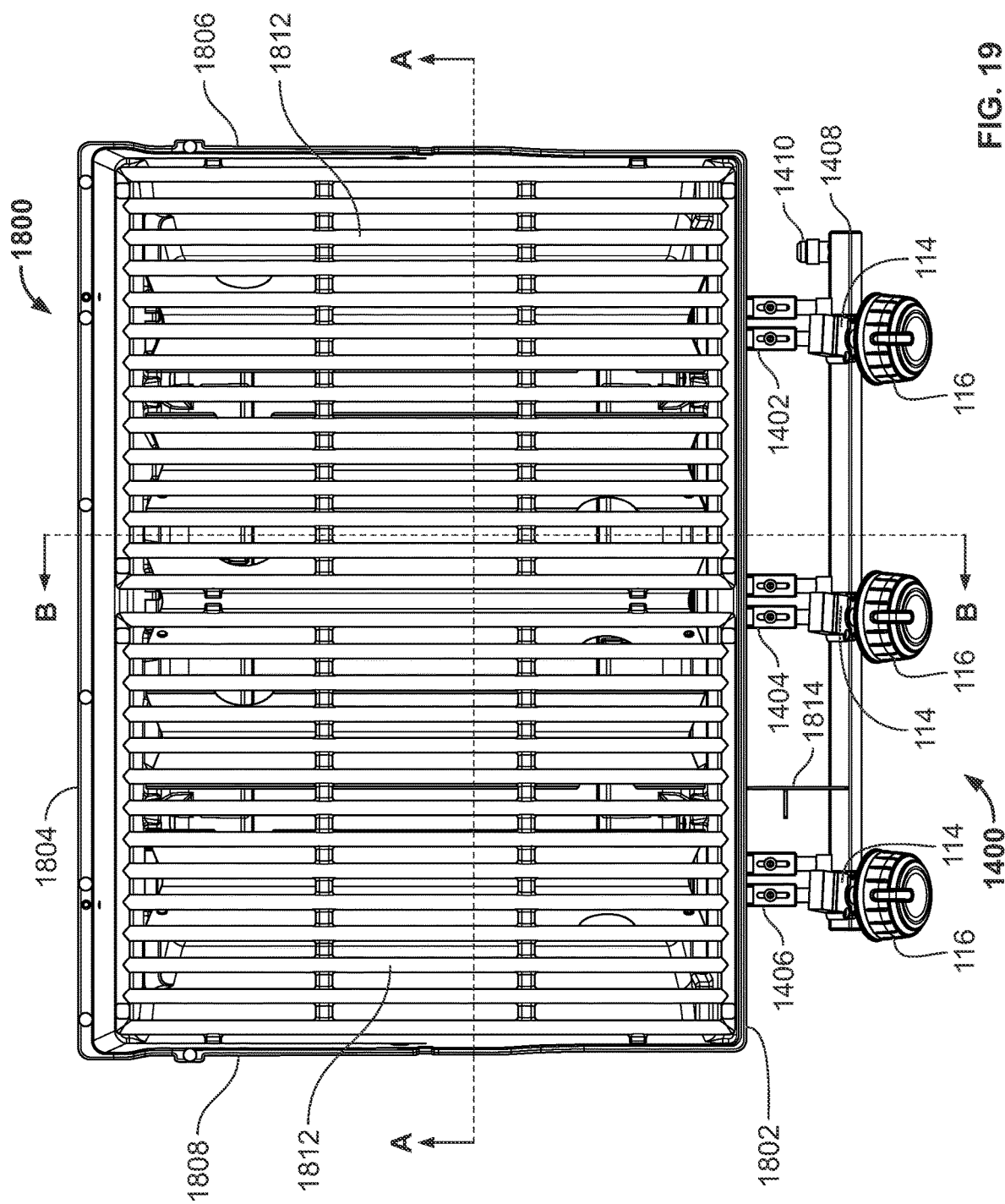
FIG. 19 is a top view of the cookbox of FIG. 18, with the gas burner assembly of FIGS. 14-17 shown coupled to the cookbox.
Figure 20:
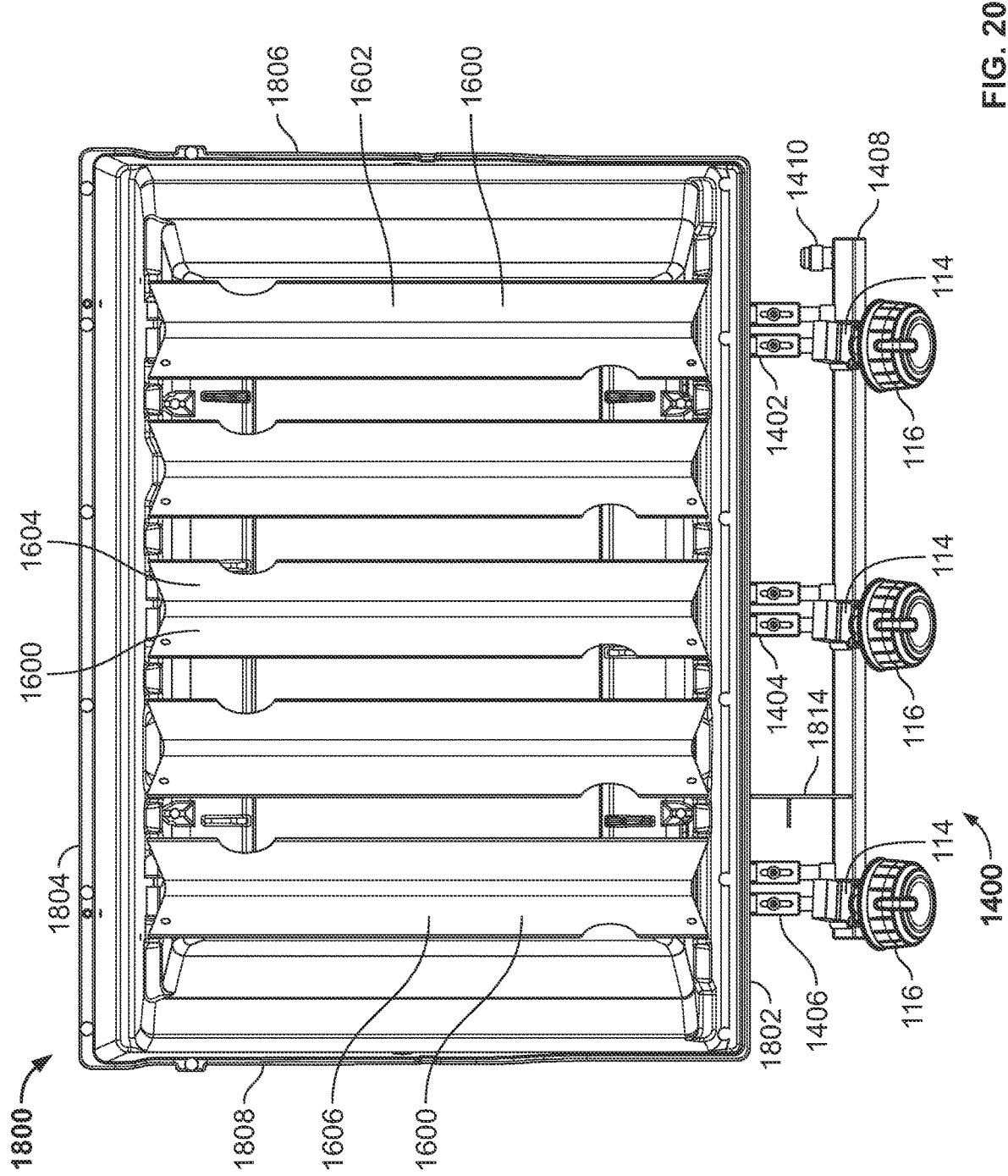
FIG. 20 is a top view of the cookbox of FIGS. 18 and 19, with the gas burner assembly of FIGS. 14-17 shown coupled to the cookbox, and with the cooking grate(s) of the cookbox removed.
Figure 21:
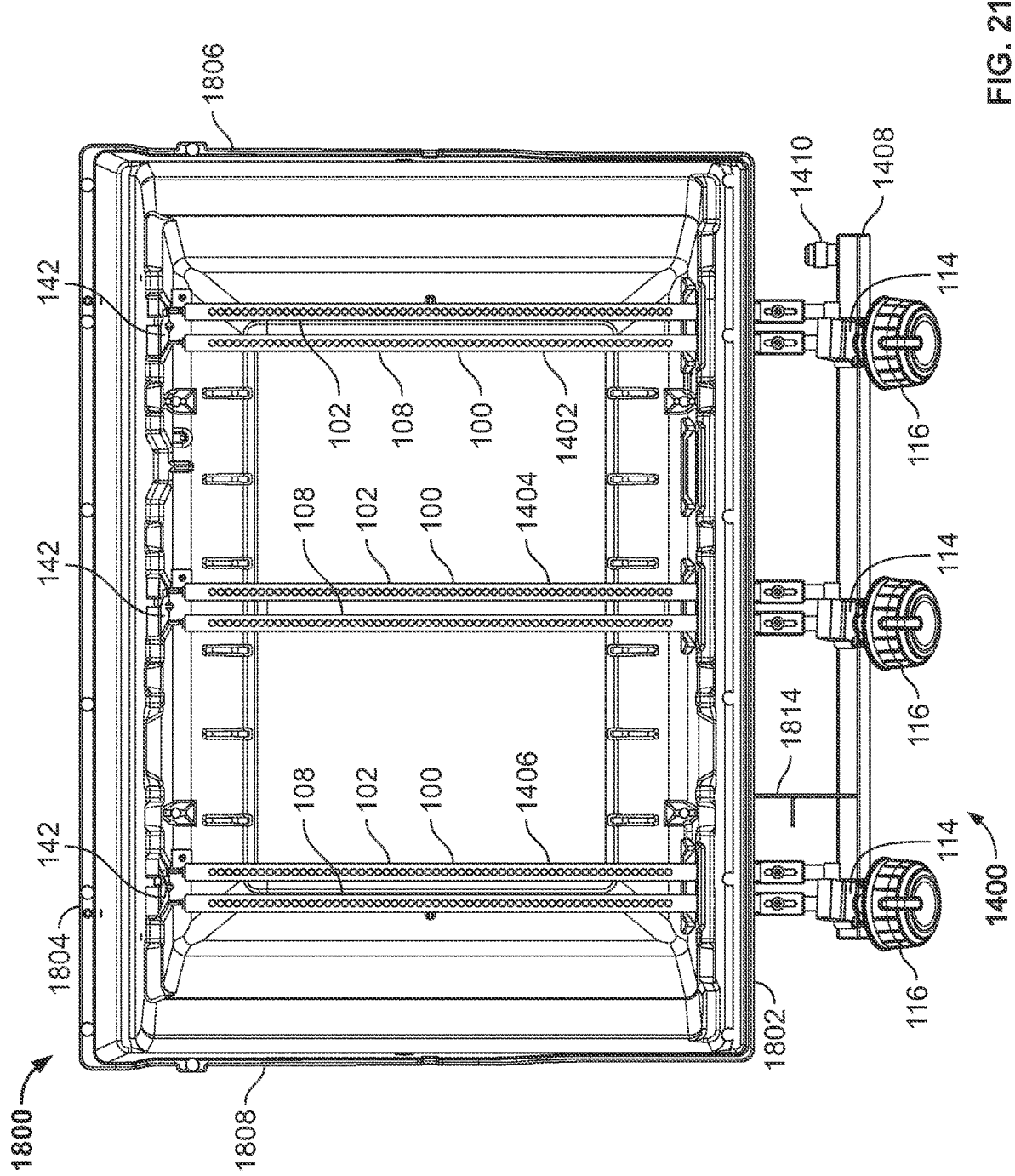
FIG. 21 is a top view of the cookbox of FIGS. 18-20, with the gas burner assembly of FIGS. 14-17 shown coupled to the cookbox, and with the cooking grate(s) and the grease deflection bars of the cookbox removed.
Figure 22:
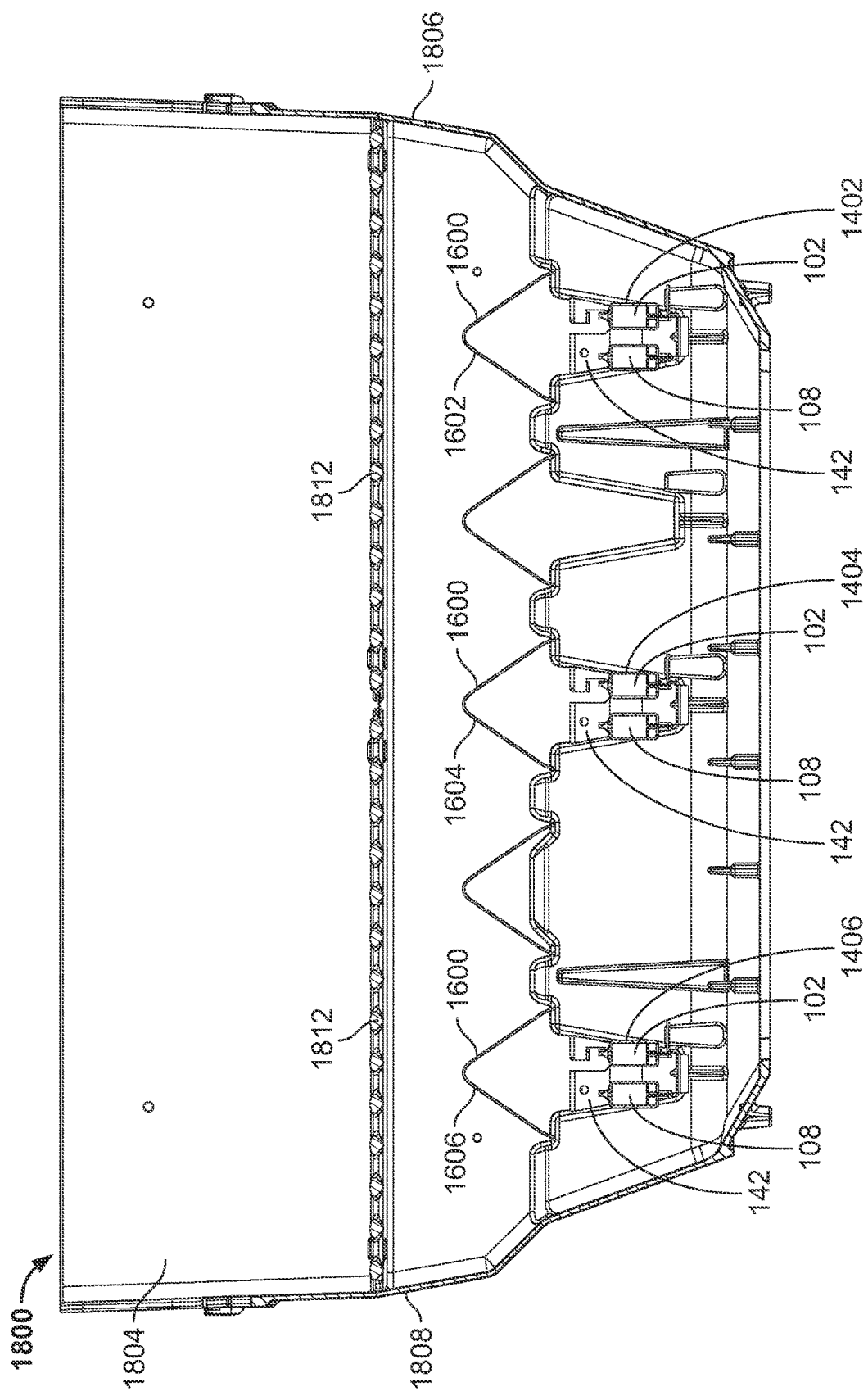
FIG. 22 is a cross-sectional view of the cookbox of FIGS. 18-21 taken along section A-A of FIG. 19, with the gas burner assembly of FIGS. 14-17 shown coupled to the cookbox.
Figure 23:
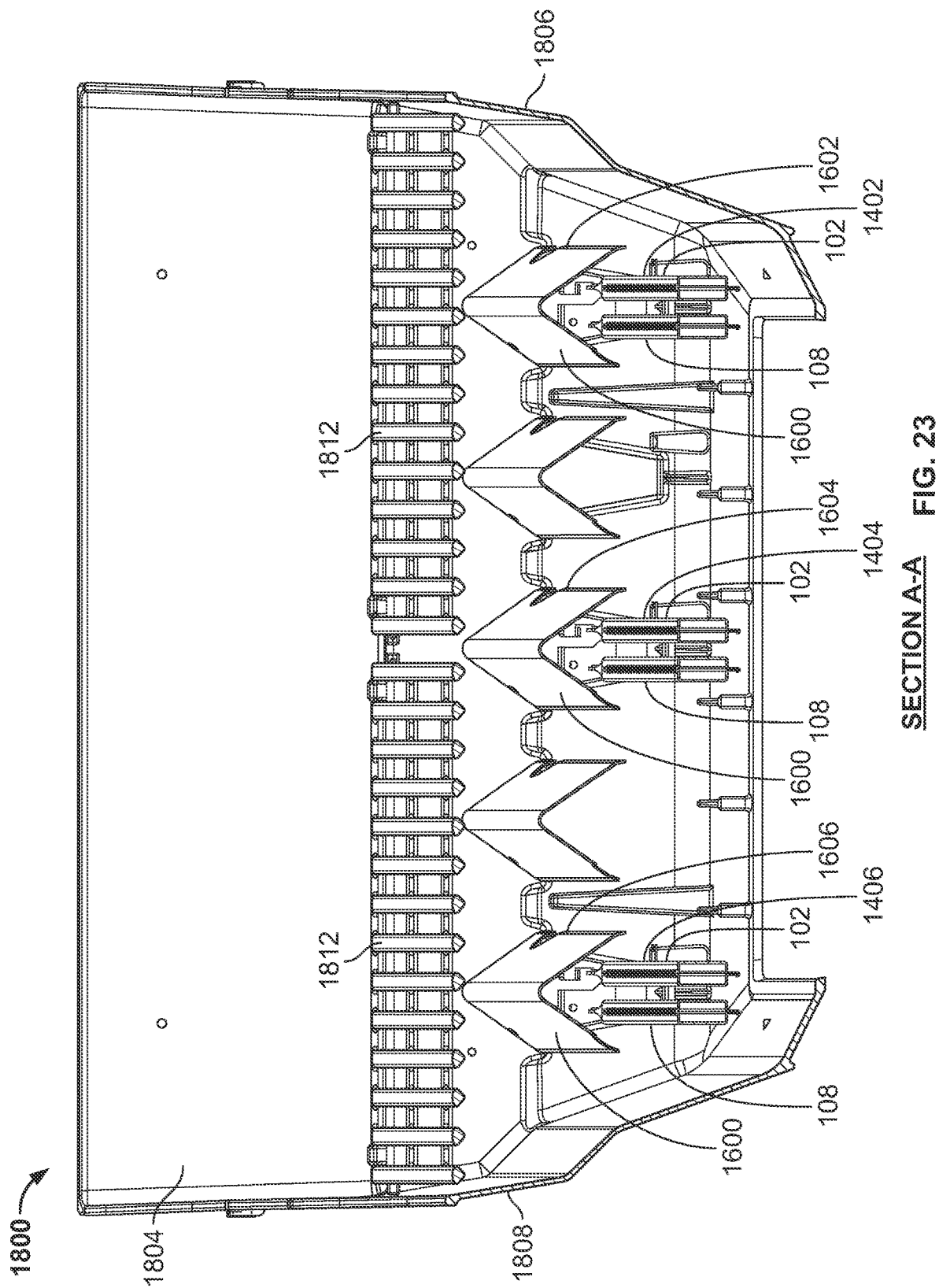
FIG. 23 is a perspective cross-sectional view of the cookbox of FIGS. 18-22 taken along section A-A of FIG. 19, with the gas burner assembly of FIGS. 14-17 shown coupled to the cookbox.
Figure 24:
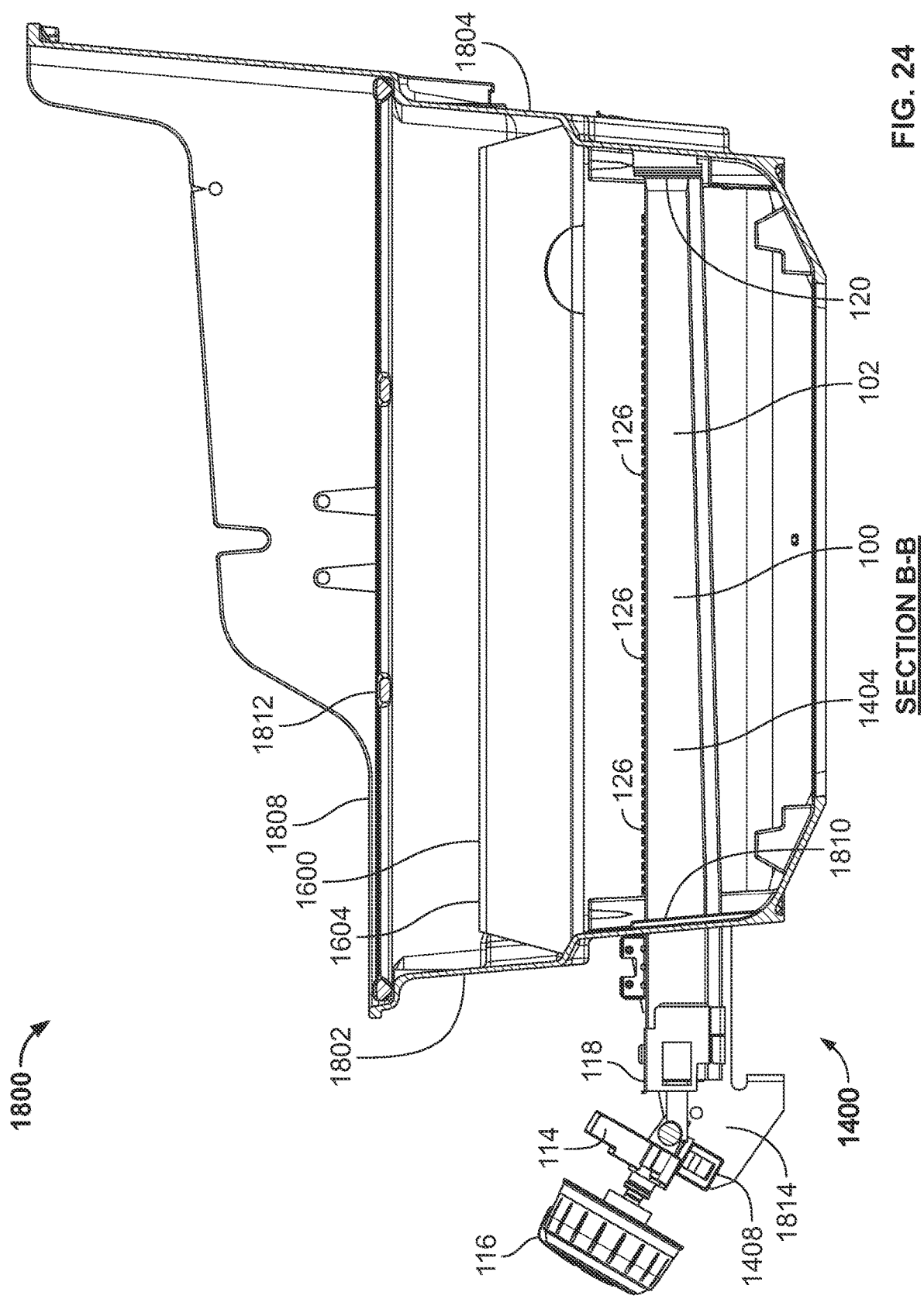
FIG. 24 is a cross-sectional view of the cookbox of FIGS. 18-23 taken along section B-B of FIG. 19, with the gas burner assembly of FIGS. 14-17 shown coupled to the cookbox.
Figure 25:
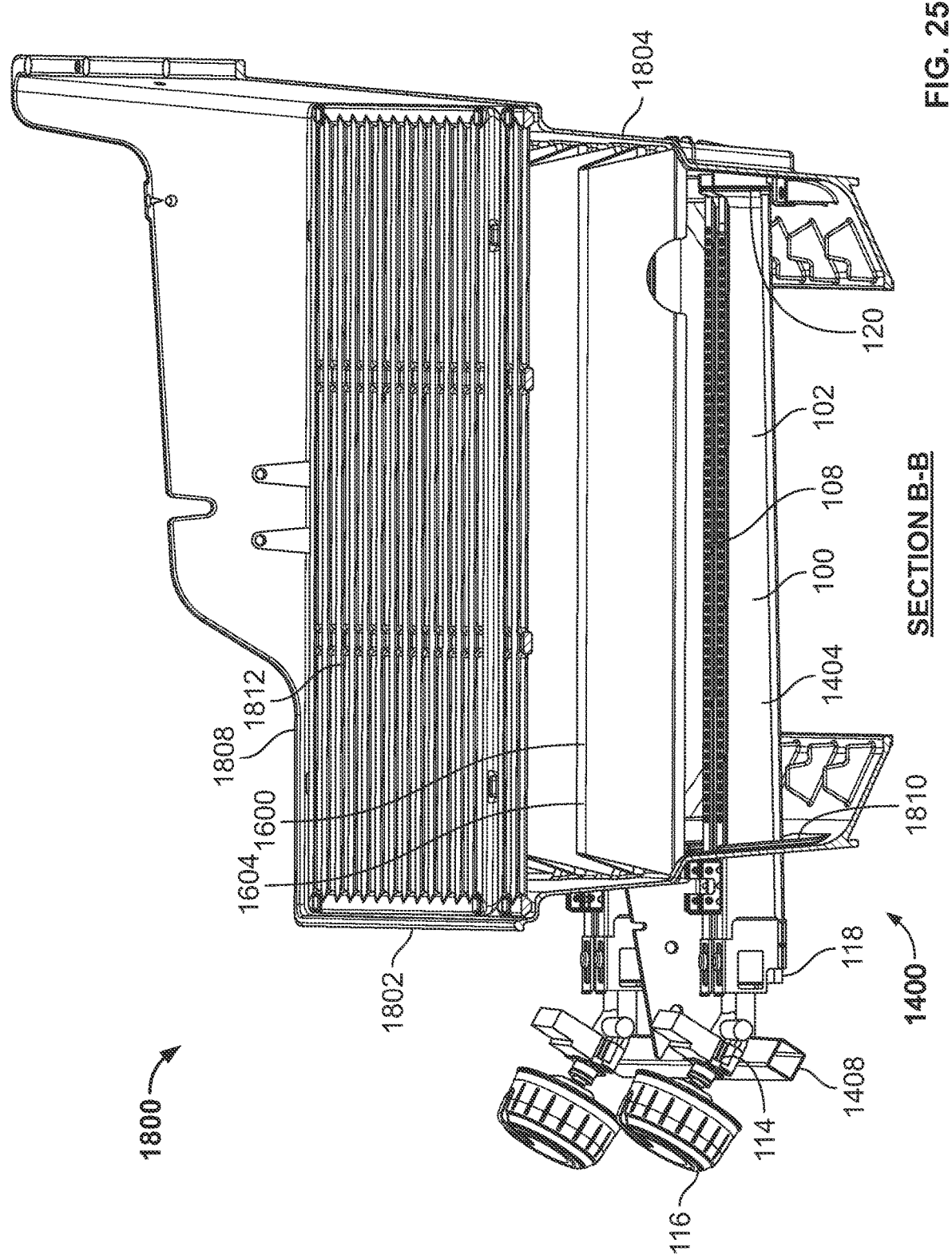
FIG. 25 is a perspective cross-sectional view of the cookbox of FIGS. 18-24 taken along section B-B of FIG. 19, with the gas burner assembly of FIGS. 14-17 shown coupled to the cookbox.

FIG. 18 is a perspective view of an example cookbox 1800 of a gas grill, with the gas burner assembly 1400 of FIGS. 14-17 shown coupled to the cookbox 1800. FIG. 19 is a top view of the cookbox 1800 of FIG. 18, with the gas burner assembly 1400 of FIGS. 14-17 shown coupled to the cookbox 1800. FIG. 20 is a top view of the cookbox 1800 of FIGS. 18 and 19, with the gas burner assembly 1400 of FIGS. 14-17 shown coupled to the cookbox 1800, and with the cooking grate(s) (e.g., as described below) of the cookbox 1800 removed. FIG. 21 is a top view of the cookbox 1800 of FIGS. 18-20, with the gas burner assembly 1400 of FIGS. 14-17 shown coupled to the cookbox 1800, and with the cooking grate(s) (e.g., as described below) and the grease deflection bars (e.g., as described below) of the cookbox 1800 removed. FIG. 22 is a cross-sectional view of the cookbox 1800 of FIGS. 18-21 taken along section A-A of FIG. 19, with the gas burner assembly 1400 of FIGS. 14-17 shown coupled to the cookbox 1800. FIG. 23 is a perspective cross-sectional view of the cookbox 1800 of FIGS. 18-22 taken along section A-A of FIG. 19, with the gas burner assembly 1400 of FIGS. 14-17 shown coupled to the cookbox 1800. FIG. 24 is a cross-sectional view of the cookbox 1800 of FIGS. 18-23 taken along section B-B of FIG. 19, with the gas burner assembly 1400 of FIGS. 14-17 shown coupled to the cookbox 1800. FIG. 25 is a perspective cross-sectional view of the cookbox 1800 of FIGS. 18-24 taken along section B-B of FIG. 19, with the gas burner assembly 1400 of FIGS. 14-17 shown coupled to the cookbox 1800.

In the illustrated example of FIGS. 18-25, the cookbox 1800 includes an example front wall 1802, an example rear wall 1804 spaced apart from the front wall 1802, an example right sidewall 1806 extending between the front wall 1802 and the rear wall 1804, and an example left sidewall 1808 spaced apart from the right sidewall 1806 and extending between the front wall 1802 and the rear wall 1804. The front wall 1802 of the cookbox 1800 includes example openings 1810 (e.g., through holes) respectively configured to receive a portion of one of the dual-burner assemblies 100 (e.g., the right dual-burner assembly 1402, the central dual-burner assembly 1404, or the left dual-burner assembly 1406) of the gas burner assembly 1400.

The cookbox 1800 of FIGS. 18-25 houses, carries, and/or otherwise includes a substantial portion of the gas burner assembly 1400 of FIGS. 14-17. For example, as shown in FIGS. 18-25, the rear mounting bracket 142, along with a substantial portion (e.g., including all of the ports 126) of the first burner tube 102 as well as a substantial portion (e.g., including all of the ports 136) of the second burner tube 108 of respective ones of the right dual-burner assembly 1402, the central dual-burner assembly 1404, and the left dual-burner assembly 1406 of the gas burner assembly 1400 are located within the cookbox 1800. The valve 114 and the knob 116 of respective ones of the right dual-burner assembly 1402, the central dual-burner assembly 1404, and the left dual-burner assembly 1406 of the gas burner assembly 1400 are located outside of the cookbox 1800 at a position forward of the front wall 1802 of the cookbox 1800. The gas distribution manifold 1408 of the gas burner assembly 1400 is also located outside of the cookbox 1800 at a position forward of the front wall 1802 of the cookbox 1800.

The cookbox 1800 of FIGS. 18-25 also houses, carries, and/or otherwise includes respective ones of the grease deflection bars 1600 of FIGS. 16-17, including but not limited to the first grease deflection bar 1602, the second grease deflection bar 1604, and the third grease deflection bar 1606 of FIGS. 16-17 described above. As shown in FIGS. 18-25, the first grease deflection bar 1602 is positioned and/or located within the cookbox 1800 above the right dual-burner assembly 1402 such that the ports 126 of the first burner tube 102 of the right dual-burner assembly 1402 and the ports 136 of the second burner tube 108 of the right dual-burner assembly 1402 are covered by the first grease deflection bar 1602. Similarly, the second grease deflection bar 1604 is positioned and/or located within the cookbox 1800 above the central dual-burner assembly 1404 such that the ports 126 of the first burner tube 102 of the central dual-burner assembly 1404 and the ports 136 of the second burner tube 108 of the central dual-burner assembly 1404 are covered by the second grease deflection bar 1604. Similarly, the third grease deflection bar 1606 is positioned and/or located within the cookbox 1800 above the left dual-burner assembly 1406 such that the ports 126 of the first burner tube 102 of the left dual-burner assembly 1406 and the ports 136 of the second burner tube 108 of the left dual-burner assembly 1406 are covered by the third grease deflection bar 1606.

The cookbox 1800 of FIGS. 18-25 also houses, carries, and/or otherwise includes one or more example cooking grate(s) 1812 located and/or positioned within the cookbox 1800 above the aforementioned grease deflection bars 1600 of the cookbox 1800. The cooking grate(s) 1812 is/are configured to form and/or define a substantially flat, planar cooking surface for cooking one or more food item(s) placed thereon. As shown in FIGS. 18-19, the cooking grate(s) 1812 is/are configured to fill, cover, and/or occupy the substantial entirety of the horizontal form factor and/or footprint of the cookbox 1800 (e.g., as defined by the width and the depth of the cookbox 1800). In other examples, the cooking grate(s) 1812 can instead be configured to fill, cover, and/or occupy a relatively smaller portion and/or percentage (e.g., less than the substantial entirety) of the horizontal form factor and/or footprint of the cookbox 1800.

In the illustrated example of FIGS. 18-25, the rear mounting bracket 142 of respective ones of the right dual-burner assembly 1402, the central dual-burner assembly 1404, and the left dual-burner assembly 1406 of the gas burner assembly 1400 is coupled to the rear wall 1804 of the cookbox 1800. The gas distribution manifold 1408 of the gas burner assembly is coupled to the front wall 1802 of the cookbox 1800 via an example manifold mounting bracket 1814. As described above, inlet port 1410 of the gas distribution manifold 1408 is configured to receive pressurized gas from a gas source (e.g., a propane cylinder, a gas line, etc.) such that the gas distribution manifold 1408 routes and/or distributes pressurized gas received at the inlet port 1410 to each of the right dual-burner assembly 1402, the central dual-burner assembly 1404, and the left dual-burner assembly 1406 of the gas burner assembly 1400.

Figure 26:
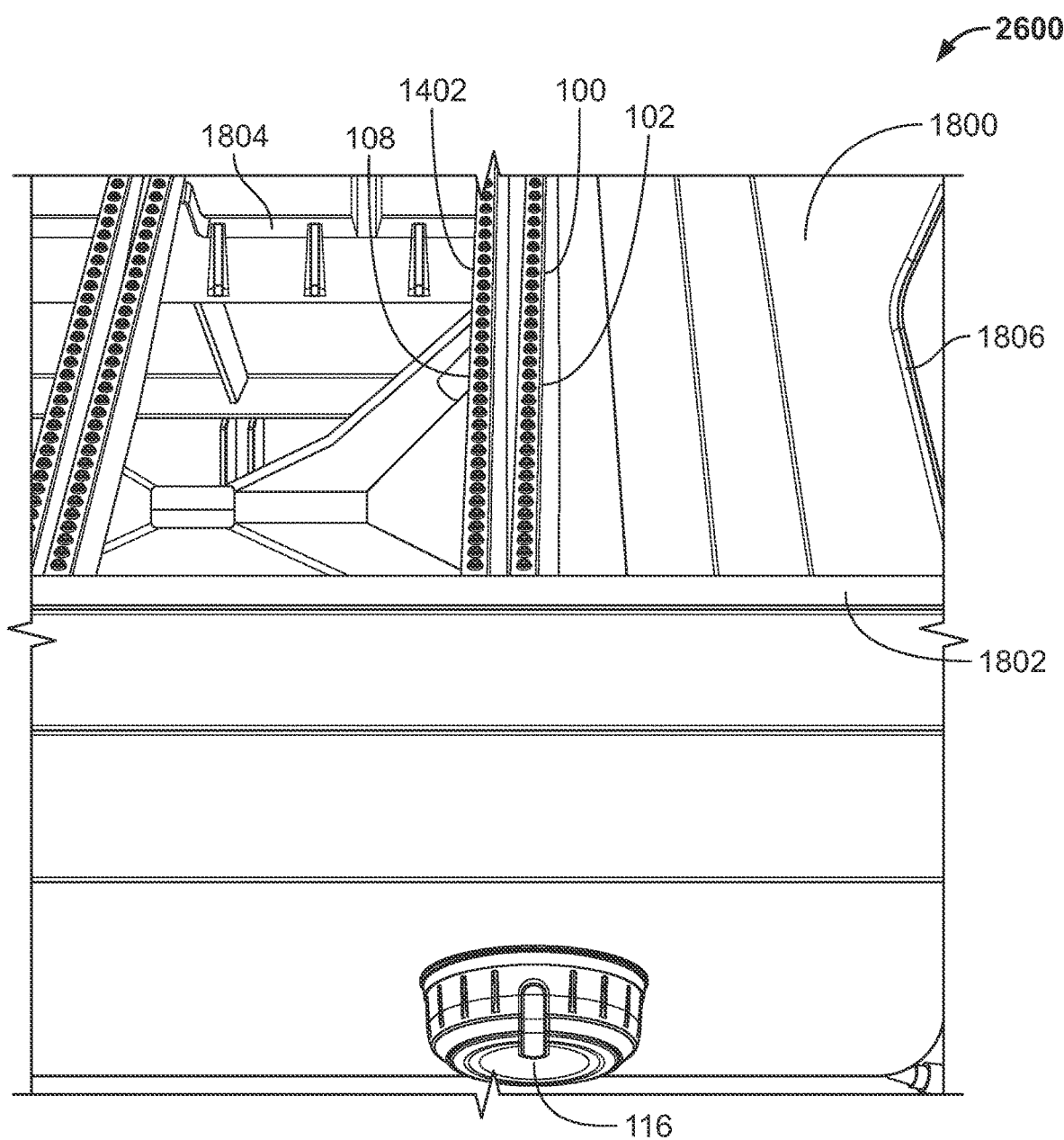
FIG. 26 is a partial perspective view of the cookbox of FIGS. 18-25 including the gas burner assembly of FIGS. 14-17, with a dual-burner assembly of the gas burner assembly shown in an example OFF state.

FIG. 26 is a partial perspective view of the cookbox 1800 of FIGS. 18-25 including the gas burner assembly 1400 of FIGS. 14-17, with a dual-burner assembly 100 of the gas burner assembly 1400 shown in an example OFF state 2600. More specifically, in the illustrated example of FIG. 26, the right dual-burner assembly 1402 of the gas burner assembly 1400 is shown in the OFF state 2600. It is to be understood, however, that the central dual-burner assembly 1404 and/or the left dual-burner assembly 1406 of the gas burner assembly 1400 can similarly be placed in the illustrated OFF state 2600.

In the illustrated example of FIG. 26, the knob 116 of the right dual-burner assembly 1402 is positioned at zero degrees (0°). The positioning of the knob 116 at zero degrees (0°) causes the flow control member of the valve 114 of the right dual-burner assembly 1402 to block and/or otherwise prevent gas from passing into both the first burner tube 102 of the right dual-burner assembly 1402 and the second burner tube 108 of the right dual-burner assembly 1402. The heat output of the first burner tube 102 (e.g., the right burner tube) of the right dual-burner assembly 1402 and the heat output of the second burner tube 108 (e.g., the left burner tube) of the right dual-burner assembly 1402 are accordingly both zero (0) BTU/hour when the right dual-burner assembly 1402 is in the OFF state 2600 of FIG. 26. The total heat output of the right dual-burner assembly 1402 is accordingly zero (0) BTU/hour when the right dual-burner assembly 1402 is in the OFF state 2600 of FIG. 26.

Figure 27:
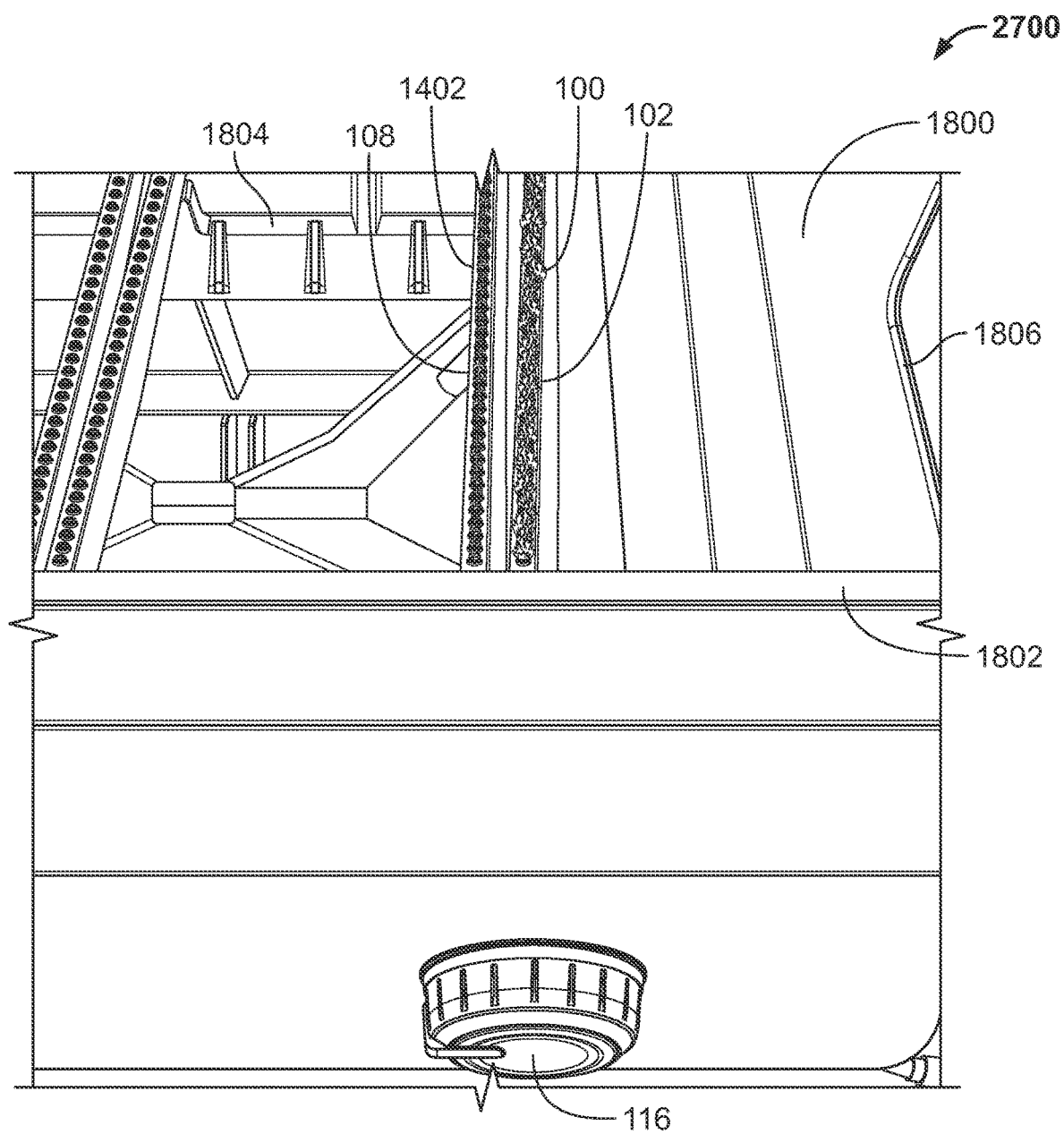
FIG. 27 is a partial perspective view of the cookbox of FIGS. 18-26 including the gas burner assembly of FIGS. 14-17, with a dual-burner assembly of the gas burner assembly shown in an example HIGH state.

FIG. 27 is a partial perspective view of the cookbox 1800 of FIGS. 18-26 including the gas burner assembly 1400 of FIGS. 14-17, with a dual-burner assembly 100 of the gas burner assembly 1400 shown in an example HIGH state 2700. More specifically, in the illustrated example of FIG. 27, the right dual-burner assembly 1402 of the gas burner assembly 1400 is shown in the HIGH state 2700. It is to be understood, however, that the central dual-burner assembly 1404 and/or the left dual-burner assembly 1406 of the gas burner assembly 1400 can similarly be placed in the illustrated HIGH state 2700.

In the illustrated example of FIG. 27, the knob 116 of the right dual-burner assembly 1402 has been rotated ninety degrees (90°) counter-clockwise from the zero degrees (0°) position associated with the OFF state 2600 of FIG. 26. The positioning of the knob 116 at ninety degrees (0°) counter-clockwise from the zero degrees (0°) position causes the flow control member of the valve 114 of the right dual-burner assembly 1402 to enable gas to pass fully into both the first burner tube 102 of the right dual-burner assembly 1402 and the second burner tube 108 of the right dual-burner assembly 1402. The heat output of the first burner tube 102 (e.g., the right burner tube) of the right dual-burner assembly 1402 is 13,500 BTU/hour when the right dual-burner assembly 1402 is in the HIGH state 2700 of FIG. 27, and the heat output of the second burner tube 108 (e.g., the left burner tube) of the right dual-burner assembly 1402 is 3,500 BTU/hour when the right dual-burner assembly 1402 is in the HIGH state 2700 of FIG. 27. The total heat output of the right dual-burner assembly 1402 is accordingly 17,000 BTU/hour when the right dual-burner assembly 1402 is in the HIGH state 2700 of FIG. 27.

Figure 28:
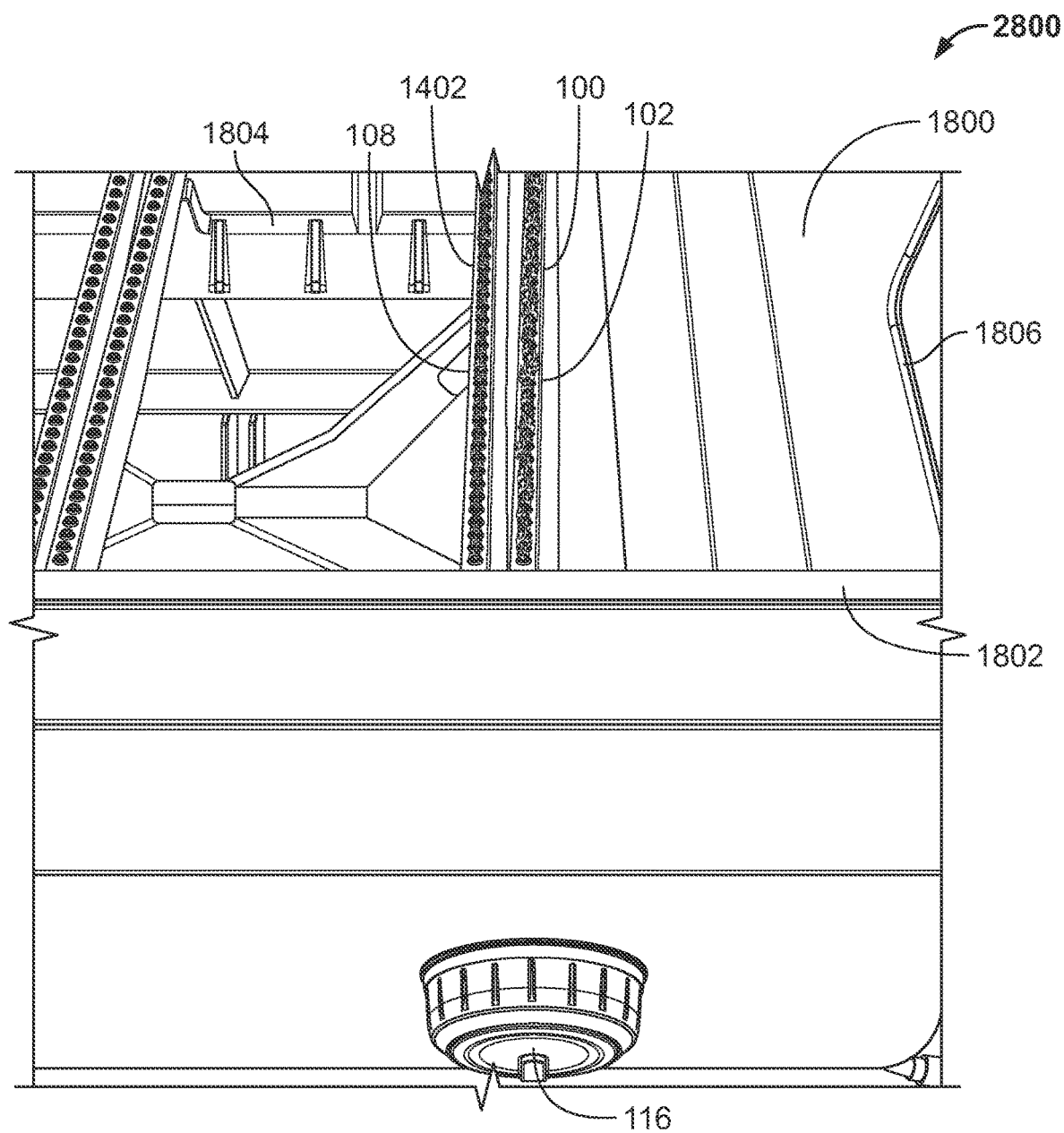
FIG. 28 is a partial perspective view of the cookbox of FIGS. 18-27 including the gas burner assembly of FIGS. 14-17, with a dual-burner assembly of the gas burner assembly shown in an example MEDIUM state.

FIG. 28 is a partial perspective view of the cookbox 1800 of FIGS. 18-27 including the gas burner assembly 1400 of FIGS. 14-17, with a dual-burner assembly 100 of the gas burner assembly 1400 shown in an example MEDIUM state 2800. More specifically, in the illustrated example of FIG. 28, the right dual-burner assembly 1402 of the gas burner assembly 1400 is shown in the MEDIUM state 2800. It is to be understood, however, that the central dual-burner assembly 1404 and/or the left dual-burner assembly 1406 of the gas burner assembly 1400 can similarly be placed in the illustrated MEDIUM state 2800.

In the illustrated example of FIG. 28, the knob 116 of the right dual-burner assembly 1402 has been rotated one hundred and eighty degrees (180°) counter-clockwise from the zero degrees (0°) position associated with the OFF state 2600 of FIG. 26. The positioning of the knob 116 at one hundred and eighty degrees (180°) counter-clockwise from the zero degrees (0°) position causes the flow control member of the valve 114 of the right dual-burner assembly 1402 to enable gas to pass only partially into the first burner tube 102 of the right dual-burner assembly 1402, and to pass fully into the second burner tube 108 of the right dual-burner assembly 1402. The heat output of the first burner tube 102 (e.g., the right burner tube) of the right dual-burner assembly 1402 is 6,000 BTU/hour when the right dual-burner assembly 1402 is in the MEDIUM state 2800 of FIG. 28, and the heat output of the second burner tube 108 (e.g., the left burner tube) of the right dual-burner assembly 1402 is 3,500 BTU/hour when the right dual-burner assembly 1402 is in the MEDIUM state 2800 of FIG. 28. The total heat output of the right dual-burner assembly 1402 is accordingly 9,500 BTU/hour when the right dual-burner assembly 1402 is in the MEDIUM state 2800 of FIG. 28.

Figure 29:
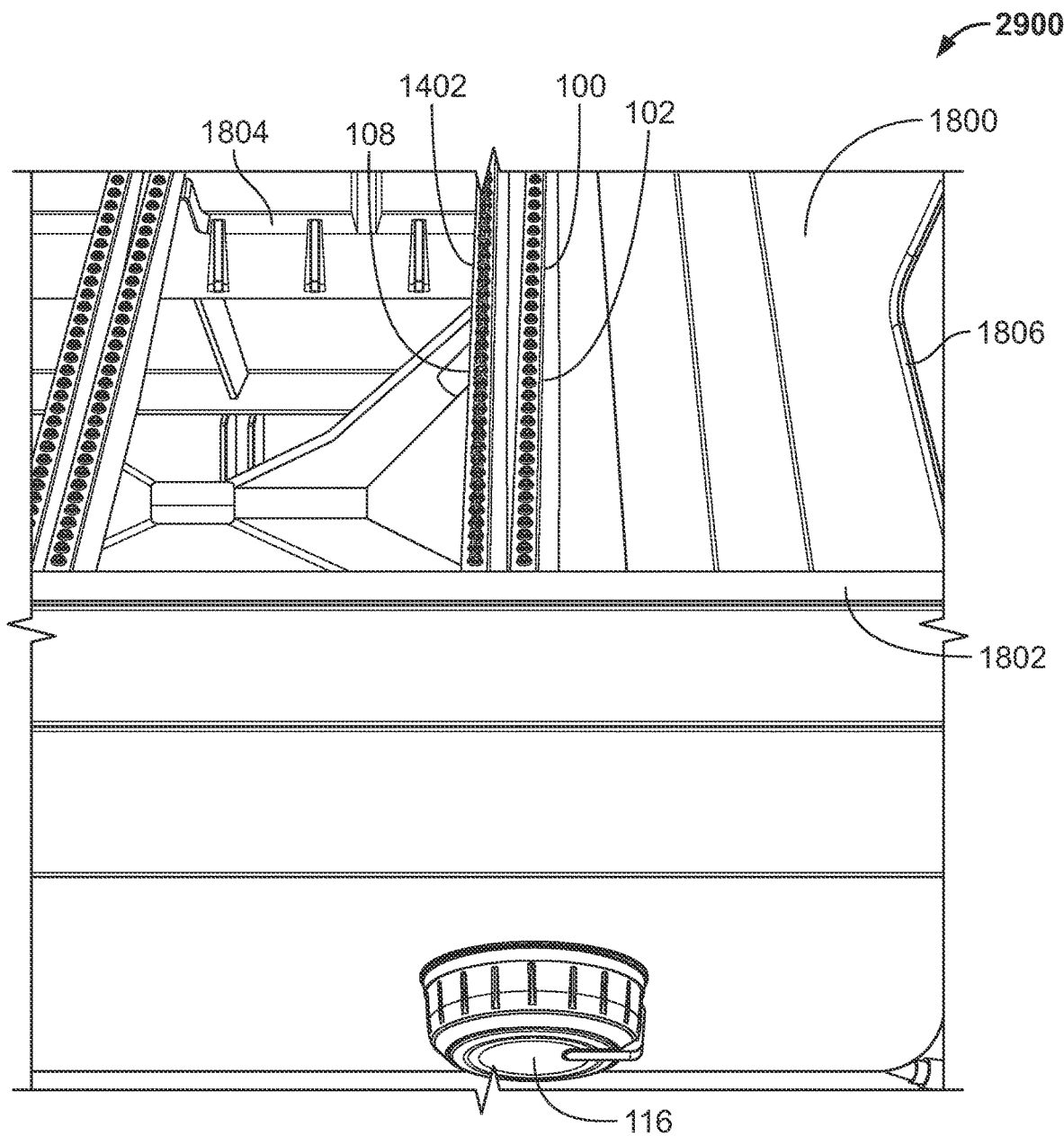
FIG. 29 is a partial perspective view of the cookbox of FIGS. 18-28 including the gas burner assembly of FIGS. 14-17, with a dual-burner assembly of the gas burner assembly shown in an example LOW state.

FIG. 29 is a partial perspective view of the cookbox 1800 of FIGS. 18-28 including the gas burner assembly 1400 of FIGS. 14-17, with a dual-burner assembly 100 of the gas burner assembly 1400 shown in an example LOW state 2900. More specifically, in the illustrated example of FIG. 29, the right dual-burner assembly 1402 of the gas burner assembly 1400 is shown in the LOW state 2900. It is to be understood, however, that the central dual-burner assembly 1404 and/or the left dual-burner assembly 1406 of the gas burner assembly 1400 can similarly be placed in the illustrated LOW state 2900.

In the illustrated example of FIG. 29, the knob 116 of the right dual-burner assembly 1402 has been rotated two hundred and seventy degrees (270°) counter-clockwise from the zero degrees (0°) position associated with the OFF state 2600 of FIG. 26. The positioning of the knob 116 at two hundred and seventy degrees (270°) counter-clockwise from the zero degrees (0°) position causes the flow control member of the valve 114 of the right dual-burner assembly 1402 to block and/or otherwise prevent gas from passing into the first burner tube 102 of the right dual-burner assembly 1402, and to enable gas to pass fully into the second burner tube 108 of the right dual-burner assembly 1402. The heat output of the first burner tube 102 (e.g., the right burner tube) of the right dual-burner assembly 1402 is zero (0) BTU/hour when the right dual-burner assembly 1402 is in the LOW state 2900 of FIG. 29, and the heat output of the second burner tube 108 (e.g., the left burner tube) of the right dual-burner assembly 1402 is 3,500 BTU/hour when the right dual-burner assembly 1402 is in the LOW state 2900 of FIG. 29. The total heat output of the right dual-burner assembly 1402 is accordingly 3,500 BTU/hour when the right dual-burner assembly 1402 is in the LOW state 2900 of FIG. 29.

The specific knob positions, individual burner tube heat outputs, and total dual-burner assembly heat outputs associated with the OFF state 2600 of FIG. 26, the HIGH state 2700 of FIG. 27, the MEDIUM state 2800 of FIG. 28, and the LOW state 2900 of FIG. 29 described above are intended to provide an example implementation one or more of the dual-burner assemblies 100 (e.g., the right dual-burner assembly 1402, the central dual-burner assembly 1404, and/or the left dual-burner assembly 1406) of the gas burner assembly 1400. It is to be understood that different knob positions, different individual burner tube heat outputs, and different total dual-burner assembly heat outputs associated with the OFF state 2600 of FIG. 26, the HIGH state 2700 of FIG. 27, the MEDIUM state 2800 of FIG. 28, and/or the LOW state 2900 of FIG. 29 are within the scope of the invention.

From the foregoing, it will be appreciated that example dual-burner assemblies disclosed herein provide numerous enhancements for gas-fueled outdoor cooking appliances, and particularly for cookboxes of gas grills. The improved operational heating range and turndown ratio associated with the disclosed dual-burner assemblies enable the dual-burner assembly to achieve higher energy levels (and thus higher cook temperatures) as well as lower energy levels (and thus lower cook temperatures) relative to known atmospheric burners. These improvements provide numerous advantages to the gas-fueled outdoor cooking appliance and the user experience associated therewith. For example, the higher energy levels achievable via the disclosed dual-burner assemblies significantly reduce the time needed to preheat the gas-fueled outdoor cooking appliance. As another example, when multiple instances of the disclosed dual-burner assemblies are implemented within a cookbox of a gas grill, the higher energy levels achievable via the disclosed dual-burner assemblies enable the entire cooking surface of the gas grill to be used for high-heat searing. As another example, when multiple instances of the disclosed dual-burner assemblies are implemented within a cookbox of a gas grill, the lower energy levels achievable via the disclosed dual-burner assemblies enable the entire cooking surface of the gas grill to be used for low-heat cooking, including simmering and smoking.

In some examples, a dual-burner assembly for a cookbox of a gas grill is disclosed. In some disclosed examples, the dual-burner assembly comprises a first burner tube having a first maximum heat output. In some disclosed examples, the dual-burner assembly further comprises a second burner tube having a second maximum heat output, the second burner tube spaced apart from the first burner tube by a distance of no more than 0.750 inches, the second maximum heat output being less than the first maximum heat output.

In some disclosed examples, the first burner tube and the second burner tube respectively have a linear shape.

In some disclosed examples, the dual-burner assembly further comprises a bridging flange extending between the first burner tube and the second burner tube, the bridging flange coupling the first burner tube to the second burner tube.

In some disclosed examples, the first maximum heat output is between 10,000 and 15,000 British Thermal Units per hour, and the second maximum heat output is between 3,000 and 5,000 British Thermal Units per hour.

In some disclosed examples, an operational heating range of the dual-burner assembly is no less than 10,000 British Thermal Units per hour.

In some disclosed examples, a turndown ratio of the dual-burner assembly is no less than 3.00.

In some disclosed examples, the dual-burner assembly has a width measured across the first burner tube and the second burner tube, the width of the dual-burner assembly being no more than 2.0 inches.

In some disclosed examples, the dual-burner assembly is configured to be positioned below a grease deflection bar, the grease deflection bar having a width greater than the width of the dual-burner assembly.

In some disclosed examples, the first burner tube includes ports configured to emit flames from the first burner tube, the second burner tube includes ports configured to emit flames from the second burner tube, and the grease deflection bar is configured to cover the ports of the first burner tube and the ports of the second burner tube.

In some disclosed examples, the dual-burner assembly further comprises a valve. In some disclosed examples, the valve includes an inlet port configured to receive pressurized gas, a first outlet port in fluid communication with the first burner tube, a second outlet port in fluid communication with the second burner tube, a flow control member movable to selectively enable the pressurized gas to flow from the inlet port to the first outlet port and to selectively enable the pressurized gas to flow from the inlet port to the second outlet port, and a stem mechanically coupled to the flow control member such that movement of the stem causes a corresponding movement of the flow control member.

In some disclosed examples, the dual-burner assembly further comprises a knob, the knob being mechanically coupled to the stem of the valve such that movement of the knob causes a corresponding movement of the stem.

In some disclosed examples, the dual-burner assembly is operable in each of an off state, a high state, a medium state, and a low state, wherein the knob is movable to different positions to selectively place the dual-burner assembly in corresponding ones of the off state, the high state, the medium state, and the low state.

In some disclosed examples, the dual-burner assembly has a first total heat output associated with the off state, a second total heat output associated with the high state, a third total heat output associated with the medium state, and a fourth total heat output associated with the low state.

In some disclosed examples, the third total heat output is less than the second total heat output, the fourth total heat output is less than the third total heat output, and the first total heat output is less than the fourth total heat output.

In some disclosed examples, the first total heat output is zero British Thermal Units per hour.

In some disclosed examples, the second total heat output is between 13,000 and 20,000 British Thermal Units per hour.

In some disclosed examples, the fourth total heat output is between 3,000 and 5,000 British Thermal Units per hour.

In some examples, an apparatus is disclosed. In some disclosed examples, the apparatus comprises a cookbox of a gas grill, and a dual-burner assembly coupled to the cookbox. In some disclosed examples, the dual-burner assembly includes a first burner tube having a first maximum heat output, and a second burner tube having a second maximum heat output, the second burner tube spaced apart from the first burner tube by a distance of no more than 0.750 inches, the second maximum heat output being less than the first maximum heat output.

In some disclosed examples, the first burner tube and the second burner tube respectively have a linear shape.

In some disclosed examples, the dual-burner assembly further includes a bridging flange extending between the first burner tube and the second burner tube, the bridging flange coupling the first burner tube to the second burner tube.

In some disclosed examples, the first maximum heat output is between 10,000 and 15,000 British Thermal Units per hour, and the second maximum heat output is between 3,000 and 5,000 British Thermal Units per hour.

In some disclosed examples, an operational heating range of the dual-burner assembly is no less than 10,000 British Thermal Units per hour.

In some disclosed examples, a turndown ratio of the dual-burner assembly is no less than 3.00.

In some disclosed examples, the dual-burner assembly has a width measured across the first burner tube and the second burner tube, the width of the dual-burner assembly being no more than 2.0 inches.

In some disclosed examples, the apparatus further comprises a grease deflection bar positioned within the cookbox over the dual-burner assembly, the grease deflection bar having a width greater than the width of the dual-burner assembly.

In some disclosed examples, the first burner tube includes ports configured to emit flames from the first burner tube, the second burner tube includes ports configured to emit flames from the second burner tube, and the grease deflection bar is configured to cover the ports of the first burner tube and the ports of the second burner tube.

In some disclosed examples, the dual-burner assembly further includes a valve, the valve. In some disclosed examples, the valve includes an inlet port configured to receive pressurized gas, a first outlet port in fluid communication with the first burner tube, a second outlet port in fluid communication with the second burner tube, a flow control member movable to selectively enable the pressurized gas to flow from the inlet port to the first outlet port and to selectively enable the pressurized gas to flow from the inlet port to the second outlet port, and a stem mechanically coupled to the flow control member such that movement of the stem causes a corresponding movement of the flow control member.

In some disclosed examples, the dual-burner assembly further includes a knob, the knob being mechanically coupled to the stem of the valve such that movement of the knob causes a corresponding movement of the stem.

In some disclosed examples, the dual-burner assembly is operable in each of an off state, a high state, a medium state, and a low state, and wherein the knob is movable to different positions to selectively place the dual-burner assembly in corresponding ones of the off state, the high state, the medium state, and the low state.

In some disclosed examples, the dual-burner assembly has a first total heat output associated with the off state, a second total heat output associated with the high state, a third total heat output associated with the medium state, and a fourth total heat output associated with the low state.

In some disclosed examples, the third total heat output is less than the second total heat output, the fourth total heat output is less than the third total heat output, and the first total heat output is less than the fourth total heat output.

In some disclosed examples, the first total heat output is zero British Thermal Units per hour.

In some disclosed examples, the second total heat output is between 13,000 and 20,000 British Thermal Units per hour.

In some disclosed examples, the fourth total heat output is between 3,000 and 5,000 British Thermal Units per hour.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A dual-burner assembly for a cookbox of a gas grill, the dual-burner assembly comprising:
a first burner tube having a first maximum heat output, the first burner tube defining a first body, the first body defining a first longitudinal axis between a first end of the first body and a second end of the first body opposite the first end, the first end of the first body to couple to a first wall of the cookbox and the second end of the first body to couple to a second wall of the cookbox opposite the first wall; and
a second burner tube having a second maximum heat output, the second burner tube defining a second body that is separate from the first body, the second body defining a second longitudinal axis between a third end of the second body and a fourth end of the second body opposite the third end, the third end of the second body to couple to the first wall of the cookbox and the fourth end of the second body to couple to the second wall of the cookbox opposite the first wall, the first body of the first burner tube spaced apart from the second body of the second burner tube by a distance of no more than 0.750 inches, the second maximum heat output being less than the first maximum heat output.

2. The dual-burner assembly of claim 1, wherein the first burner tube and the second burner tube respectively have a linear shape.

3. The dual-burner assembly of claim 1, further comprising a bridging flange extending between the first burner tube and the second burner tube, the bridging flange coupling the first burner tube to the second burner tube.

4. The dual-burner assembly of claim 1, wherein the first maximum heat output is between 10,000 and 15,000 British Thermal Units per hour, and the second maximum heat output is between 3,000 and 5,000 British Thermal Units per hour.

5. The dual-burner assembly of claim 1, wherein an operational heating range of the dual-burner assembly is no less than 10,000 British Thermal Units per hour.

6. The dual-burner assembly of claim 1, wherein a turndown ratio of the dual-burner assembly is no less than 3.00.

7. The dual-burner assembly of claim 1, wherein the dual-burner assembly has a width measured across the first burner tube and the second burner tube, the width of the dual-burner assembly being no more than 2.0 inches.

8. The dual-burner assembly of claim 7, wherein the dual-burner assembly is configured to be positioned below a grease deflection bar, the grease deflection bar having a width greater than the width of the dual-burner assembly.

9. A dual-burner assembly for a cookbox of a gas grill, the dual-burner assembly comprising:
a first burner tube having a first maximum heat output; and
a second burner tube having a second maximum heat output, the second burner tube spaced apart from the first burner tube by a distance of no more than 0.750 inches, the second maximum heat output being less than the first maximum heat output, the dual-burner assembly has a width measured across the first burner tube and the second burner tube, the width of the dual-burner assembly being no more than 2.0 inches, the dual-burner assembly configured to be positioned below a grease deflection bar, the grease deflection bar having a width greater than the width of the dual-burner assembly, and wherein the first burner tube includes ports configured to emit flames from the first burner tube, the second burner tube includes ports configured to emit flames from the second burner tube, and the grease deflection bar is configured to cover the ports of the first burner tube and the ports of the second burner tube.

10. The dual-burner assembly of claim 9, further comprising a valve, the valve including:
an inlet port configured to receive pressurized gas;
a first outlet port in fluid communication with the first burner tube;
a second outlet port in fluid communication with the second burner tube;
a flow control member movable to selectively enable the pressurized gas to flow from the inlet port to the first outlet port and to selectively enable the pressurized gas to flow from the inlet port to the second outlet port; and
a stem mechanically coupled to the flow control member such that movement of the stem causes a corresponding movement of the flow control member.

11. The dual-burner assembly of claim 10, further comprising a knob, the knob being mechanically coupled to the stem of the valve such that movement of the knob causes a corresponding movement of the stem.

12. The dual-burner assembly of claim 11, wherein the dual-burner assembly is operable in each of an off state, a high state, a medium state, and a low state, and wherein the knob is movable to different positions to selectively place the dual-burner assembly in corresponding ones of the off state, the high state, the medium state, and the low state.

13. The dual-burner assembly of claim 12, wherein the dual-burner assembly has a first total heat output associated with the off state, a second total heat output associated with the high state, a third total heat output associated with the medium state, and a fourth total heat output associated with the low state.

14. The dual-burner assembly of claim 13, wherein the third total heat output is less than the second total heat output, the fourth total heat output is less than the third total heat output, and the first total heat output is less than the fourth total heat output.

15. The dual-burner assembly of claim 14, wherein the first total heat output is zero British Thermal Units per hour.

16. The dual-burner assembly of claim 14, wherein the second total heat output is between 13,000 and 20,000 British Thermal Units per hour.

17. The dual-burner assembly of claim 14, wherein the fourth total heat output is between 3,000 and 5,000 British Thermal Units per hour.

18. An apparatus, comprising:
a cookbox of a gas grill;
a dual-burner assembly coupled to the cookbox, the dual-burner assembly including:
a first burner tube having a first maximum heat output; and
a second burner tube having a second maximum heat output, the first burner tube and the second burner tube are positioned in a side-by-side parallel arrangement relative to one another, the second burner tube spaced apart from the first burner tube by a distance of no more than 0.750 inches, the second maximum heat output being less than the first maximum heat output.

19. The apparatus of claim 18, wherein the dual-burner assembly has a width measured across the first burner tube and the second burner tube, the width of the dual-burner assembly being no more than 2.0 inches.

20. The apparatus of claim 19, further comprising a grease deflection bar positioned within the cookbox over the dual-burner assembly, the grease deflection bar having a width greater than the width of the dual-burner assembly.

21. The dual-burner assembly of claim 1, wherein the first longitudinal axis is parallel to the second longitudinal axis.

22. The dual-burner assembly of claim 1, wherein the first longitudinal axis is not perpendicular to the second longitudinal axis.

23. The dual-burner assembly of claim 1, wherein the first burner tube has a first length between the first end of the first body and the second end of the first body, the second burner tube having a second length between the third end of the second body and the fourth end of the second body, wherein the first length is equal to the second length.

\* \* \* \* \*